United States Patent
Yamashita et al.

[11] Patent Number: 5,875,269
[45] Date of Patent: Feb. 23, 1999

[54] INFORMATION READING DEVICE

[75] Inventors: Takashi Yamashita, Sakurai; Yasuhiro Yoshida, Nara, both of Japan

[73] Assignee: Sharp Kabushiki Kaisha, Osaka, Japan

[21] Appl. No.: 698,512

[22] Filed: Aug. 15, 1996

[30] Foreign Application Priority Data

| Aug. 29, 1995 | [JP] | Japan | 7-220465 |
| Dec. 26, 1995 | [JP] | Japan | 7-338839 |

[51] Int. Cl.$^6$ ............................................. H04N 1/04
[52] U.S. Cl. ........................... 382/312; 358/474; 358/475
[58] Field of Search ........................... 382/312; 358/474, 358/475, 482, 483; 250/208.1; H04N 1/04

[56] References Cited

U.S. PATENT DOCUMENTS

| 4,365,274 | 12/1982 | Takenouchi et al. | 358/483 |
| 4,660,095 | 4/1987 | Cannella et al. | 358/483 |
| 4,874,957 | 10/1989 | Sasaki et al. | 250/208.1 |
| 4,989,099 | 1/1991 | Koshiyouji et al. | 358/474 |
| 5,091,638 | 2/1992 | Yamazaki et al. | 250/708.1 |
| 5,187,596 | 2/1993 | Hwang | 358/484 |
| 5,432,876 | 7/1995 | Appeldorn et al. | 385/31 |
| 5,627,662 | 5/1997 | Holmes et al. | 358/474 |

FOREIGN PATENT DOCUMENTS

| 60-262236 | 12/1985 | Japan . |
| 61-7160 | 1/1986 | Japan . |
| 5-40927 | 5/1986 | Japan . |
| 4-52485 | 6/1986 | Japan . |
| 3-209872 | 9/1991 | Japan . |

OTHER PUBLICATIONS

Sensor and Signal Processing, 2nd ed., 2nd print, Kyoritu Publishing Co., 1989, p. 170 et. seq.

*Primary Examiner*—Kim Yen Vu
*Attorney, Agent, or Firm*—David G. Conlin; David D. Lowry

[57] ABSTRACT

An information reading device which has no need for mechanically moving a document or its reading portion and which is reliable to read information by using its two-dimensional reading system. A sensor panel is formed of first-layer striped electrodes made of material having high transmissivity and formed on a transparent substrate, a striped amorphous silicone layer laid with stripes disposed orthogonal to the first striped electrodes on the transparent substrate and second-layer striped electrodes made of material having a low transmissivity and formed over the striped amorphous-silicone layer. Photoelectric cells are formed one at each intersection of the first layer electrodes and the second layer electrodes. A thin flat type light source is placed on the bottom surface of the sensor panel and tightly fixed thereto. A plurality of photoelectric cells is two-dimensionally scanned by a first scanning portion and a second scanning portion and obtained current signals are converted into voltage signals by a current-to-voltage converting portion. The voltage signals are amplified by an amplifier portion and reproduced into an original image information by the signal processing portion.

3 Claims, 23 Drawing Sheets

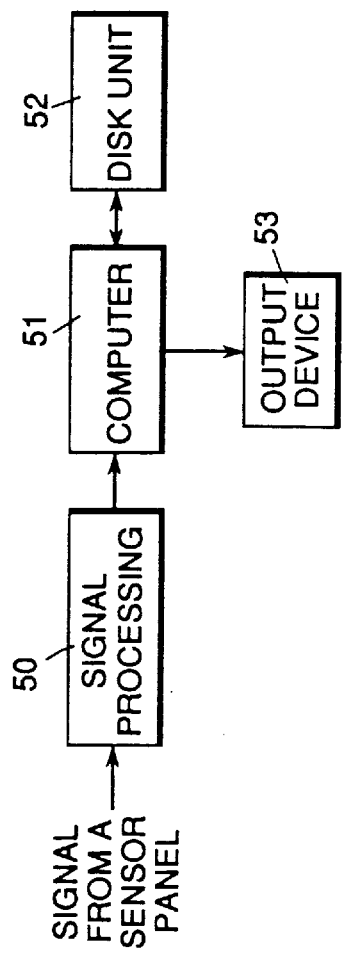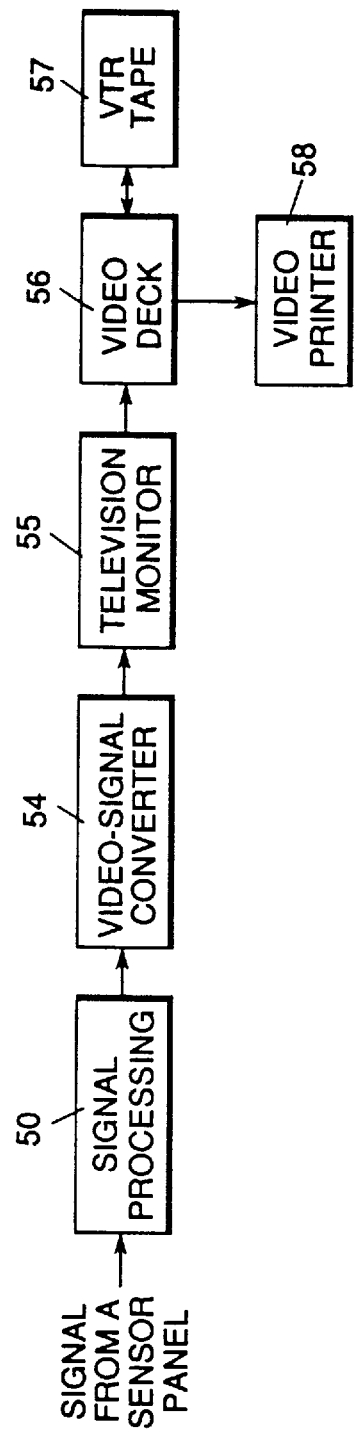

INFORMATION READING DEVICE

BACKGROUND OF THE INVENTION

The present invention relates to an information reading device for reading a document on which image information consisting of characters and graphics are written or an information reading device for reading a document having character-and-graphic information on both surfaces and, more particularly, to an information reading device which is usable as a portable type information terminal.

Information reading devices each comprising a light source for illuminating a document, a photoelectric converter having series-arranged elements for receiving light from a light-source and converting the light into electric signals, scanning means for moving relative positions of the photoelectric converter and the document in the orthogonal directions and a data processing portion for transmitting a series of output electric signals from the photoelectric converter are widely applied in facsimiles, copying machines and so on.

Hand scanners which are used as connected to a personal computer, word processor or the like for reading thereinto a part of a sentence or printed matters; These are one-dimensional line-scanners which have a limited area of reading.

There has been proposed such a two-dimensional image reading device wherein photoelectric cells formed in two-dimensional matrix serves as light-sensitive elements for optically inputting manuscript information and graphic information into a computer. For example, Japanese Laid-Open Patent No. 60-262236 describes a coordinate input device of this type which, consists of a glass substrate, a sintered CdS (Cadmium Sulfide) layer formed in stripes on the glass substrate to work as electrodes for detecting a X-coordinate value and as a n-type semiconductor of a photoelectric cell, a layer of sintered CdTe (Cadmium Tellurium) formed in stripes at a right angle to the sintered CdS stripes and as p-type semiconductor of a photoelectric cell with nodes of the CdS stripes with sintered CdTe stripes being photoelectric cells and a carbon electrode layer formed over the sintered CdS layer to works as electrodes for detecting y-coordinate values and as a doping material to the sintered CdTe layer.

In a reference book "Sensor and signal processing," (2nd ed., 2nd print, Kyoritu Publishing Co., 1989, p. 170 et. seq.), there is described how to use a coordinate input device which is, by way of example, constructed by using photodiodes. As it will be explained later on referring to the figure, two-dimensional photodiodes are scanned first from an element (n, m)=(0, 0) to an element (0, 383), next from an element (1, 0) to an element (1, 383) and further are scanned in similar way to a last element (489, 383) to detect a photodiode which light enters. The device proposed in the cited material relates to a two-dimensional sensor portion.

As described above, the prior arts have proposed:

(1) a device for reading information by mechanically moving a document or a line sensor portion; and (2) a structure of a two-dimensional reading sensor.

The conventional information reading device provided with scanning means for moving relative positions of a photoelectric converter and a document in the orthogonal directions and a data processing portion for transmitting a series of output electric signals from the photoelectric converter is widely applied in facsimiles, copying machines and so on. This device, however, has complicate construction because the need of mechanically moving the photoelectric converter or the document.

Hand scanners widely used as connected to a personal computer, word processor or the like for reading thereinto a part of a sentence or printed matters. These are one-dimensional line-scanners which, therefore, have a limited area of reading.

The coordinate input device for use in two-dimensional reading consists of a glass substrate with two layers—a CdS (Cadmium Sulfide) layer and a CdTe (Cadmium Tellurium) laid thereon to form orthogonal stripes. The glass substrate has of course a high luminous transmittance but two layers formed on the glass substrate are made of sintered cadmium having a very low luminous transmittance. Consequently, the image input device has a low luminous transmittance in the direction from the glass substrate to the photoelectric cells or from the photoelectric cells to the glass substrate. Furthermore, improving the transmittance may be accompanied by weakening the output signal. To avoid this, it is necessary to further revise how to minimize noise and amplify an output signal in the process of reproducing information. There have been still left many problems to be solved before the coordinate input devices can be put into practical use in or with portable information terminal devices.

Therefore, if the need of moving a document side or a reading sensor side can be eliminated, no driving mechanism is used and electrical two-dimensional reading system can be applied making it possible to read an entire surface of a document. Such a information reading device may bring excellent features and advantages when be applied in information processing devices. There has been a keen need for an information reading device having a very thin size, which is reliable to work, simple and easy to use. In view of the foregoing, the present invention was made to provide a two-dimensional information reading device which has no moving mechanism and can provide reliable input information.

Furthermore, the conventional information input (or reading) device which is provided with scanning means for moving position of photoelectric converter relative to a document in orthogonal directions and a data processing portion for transmitting a series of output electric signals from the photoelectric converter, is widely applied in facsimiles, copying machines and so on. This device, however, must mechanically move its photoelectric converter or a document therein. Therefore, it is not adapted to use as a portable input device.

When inputting information from both surfaces of a document by using the conventional device, one must turn over the document or move the photoelectric converter to the reverse side of the document. To input information on the reverse side of the document, it is needed to replace the document by hand or to use another device that has, besides its scanning mechanism, a mechanism for reversing a document, for example, mechanical turning-over system used in a two-sides copying machine. The latter includes a large-scale mechanical system and is bulky to carry.

Hand scanners widely used as connected to a personal computer, word processor or the like so as to input thereinto a part of a sentence or printed matters. These are one-dimensional line-scanners which, therefore, have a limited area of reading and must be manually scanned on one side of the document and manually replaced to the reverse side of the document.

Pocketbook or notebook type input devices are most desirable to carry. Japanese Laid-Open Utility Model No.

61-7160 proposes a notebook type information input device that is, however, unsuited to carry because of using a movable system of solid-state image sensors for image information inputting. Japanese Laid-Open Patent No. 3-209872 describes an information input device for detecting reflected light from a document by using two-dimensional light-receiving sensors, which, however, can not input information from both sides of the document.

SUMMARY OF THE INVENTION

It is an object of the present invention to provide a two-dimensional information reading device which has no moving mechanism and can provide reliable input information.

Another object of the present invention is to provide an information reading device for recognizing image information consisting of characters and/or graphics by transmitting light to an original document to which the image information is written and by detecting reflecting light therefrom, which device comprises:

- a sensor panel consisting of a plurality of photoelectric cells formed in a two-dimensional matrix;
- a light-source for illuminating a sheet of the original document tightly put on the sensor panel;
- a scanning portion for scanning a plurality of the photoelectric cells on the sensor panel;
- a current-to-voltage converting portion for converting a current signal, which is produced by the photoelectric cells when having received reflected light from the original document, into a voltage signal;
- an amplifier portion for amplifying an output of the current-to-voltage converting portion;
- a signal processing portion for reproducing image information consisting characters and/or graphics from a signal from the amplifier portion,
- wherein the two-dimensional matrix of the photoelectric cells of the sensor panel is formed of first-layer striped electrodes made of material having high transmissivity and formed on a transparent substrate, a striped amorphous silicone layer laid in the direction orthogonal to the first striped electrodes on the transparent substrate and second-layer striped electrodes made of material having a low transmissivity and formed over the striped amorphous-silicone layer and the photoelectric cells thus formed in two-dimensional matrix serve as light-sensitive elements for optically reading information. Image information consisting of characters and/or graphics is two-dimensionally read from a document placed on the sensor panel by electrically scanning a two-dimensional matrix of the photoelectric cells of the sensor panel. The device has no driving mechanism for mechanically moving the document or the sensor panel and requires only placing document on the sensor panel. The device can have a reduced size with a minimized thickness. Light from the light source passes through the first-layer electrodes having high transmissivity and a transparent substrate and strikes the document surface. Reflected light from the document surface passes through the transparent substrate and the first-layer electrodes and enters into photoelectric cells formed by an amorphous silicone layer sandwiched between the first-layer electrodes having a high transmissivity and the second-layer electrodes having low transmissivity. The device thus constructed can read image information at a high sensitivity.

Another object of the present invention is to provide an information reading device which is further characterized in that the light source is a flat thin plate emitting light from one surface, which is overlaid on the sensor panel and tightly fixed in a fixing frame to form a reading portion, said portion is provided with a cover for pressing an original document onto the upper surface of the sensor panel and said cover is turnably supported so that it can turn to open and close the top surface of the reading portion. The reading portion can evenly illuminate the document surface with light from the light source since it is constructed of the sensor panel with the flat thin type light source overlaid thereon and fixed with a fixing frame. The cover attached with hinges to the reading potion can be freely turned and tightly cover a document sheet on the sensor panel so as not to allow the movement of the document during reading it. Close covering the reading portion enables the device to effectively use directed light rays from the light source in the reading portion as well as to obtain stabilized signals by shutting off external light. Furthermore, tightly covered condition of the reading portion is effective to protect against external noise. Owing to hinged connection of the cover, the device can be designed of thin note type and is easy to handle, allowing any unskilled user to use it by only putting a document sheet between the cover and the sensor panel.

Another object of the present invention is to provide an information reading device which is further characterized in that the light source is a flat thin plate emitting light from one surface, which is laid over the sensor panel and tightly fixed in a fixing frame to form a reading portion, said portion is provided with a signal-converting portion for converting a signal from the reading portion into character-and-graphic image information and a cable connecting an output of the reading portion to an input of the signal converting portion, thereby the reading portion can be separated from the signal converting portion and can be put onto a space structure. When reading a character-and-graphic page of a book or information written onto a space structure, the reading portion can be freely moved thereon. The device can, of course, read information by only putting its reading portion that requires no manual or mechanical movement for scanning. Owing to this feature, the device is available as a portable information-reading device capable of inputting, for example, information from a signboard, advertising panel, door plate, label and so on.

Furthermore, it is another object of the present invention to provide an information input device which is capable of inputting information from both sides of a document without moving the document and a photoelectric converter and which is a thin-flat potable type device of high reliability.

Another object of the present invention is to provide an information reading device for inputting information by transmitting light to a document having optically readable information on both surfaces and detecting reflected light therefrom, comprising:

- a first flat reading portion consisting of a first sensor panel including a plurality of photoelectric cells formed in a two-dimensional matrix, a first light-source for illuminating a surface of a document sheet and a first supporting member for fixing the first sensor panel together with the first light source;
- a second flat reading portion consisting of a second sensor panel including a plurality of photoelectric cells formed in a two-dimensional matrix, a second light-source for illuminating a surface of a document sheet and a second supporting member for fixing the second sensor panel together with the second light source;

first scanning means for scanning a plurality of the photoelectric cells of the first sensor panel;

second scanning means for scanning a plurality of the photoelectric cells of the second sensor panel;

a processing control portion for reading information of the document from output signals of photoelectric cells by controlling the first scanning means and the second scanning means;

wherein information is inputted from the document tightly attached each surface to the first sensor panel and the second sensor panel.

According to the above mentioned device, it is possible to provide a small-sized information input device since it has no need to mechanically move a document or sensor panels and, therefore, includes no mechanical drive.

Another object of the present invention is to provide an information input device in which the first sensor panel and the second sensor panel match with each other at center axes of paired photoelectric cells.

According to the above mentioned device, it is possible to attain the same detection accuracy at the same coordinates on both sides of a document and, therefore, to homogeneously input information on both sides thereof. It is also possible to reliably detect information signals by minimizing an influence of leak light transmitted through the document.

Another object of the present invention to provide an information input device in which the first flat reading portion and the second flat reading portion are provided each with an elastic member for fixing the document.

According to the above mentioned device, it is possible to bring the first sensor panel and the second sensor panel into close contact with the top side and the reverse side of the document and to reliably hold the document.

Another object of the present invention is to provide an information input device in which the elastic member is conductive and provided at periphery of the first sensor panel and at the periphery of the second sensor panel.

According to the above mentioned device, it is possible to evenly guide light from the light sources and reliably shut off the external light by providing electrically conductive elastic members at a periphery of each sensor panel. The device can be completely shielded with the elastic members. Noise is minimized and stable output is obtained.

Another object of the present invention is to provide an information input device in which a closing means is provided for connecting the first flat reading portion with the second flat reading portion and opening and closing them.

According to the above mentioned device, it is possible to provide a pocketbook or notebook type device which is handy to carry and easy to hold a document therein. The first and second reading portions and turnably jointed with hinges that allows user to put a document on the open reading portions and then to close the reading portions with the document sandwiched therein to input the information on both sides of the document. The sensor panels can be reliably protected in the closed state of the reading portions.

Another object of the present invention is to provide an information input device in which the processing control means controls the first scanning means and the second scanning means so as to start scanning a plurality of the second sensor after completion of scanning a plurality of photoelectric cells of the first sensor panel.

According to the above mentioned device, it is possible to use the same switching mechanism for the scanning systems by starting scanning the photoelectric cells of the second sensor panel after completion of scanning the photoelectric cells of the first scanning panel. The scanning means can be simplified and can commonly use the same system for processing output signals of the photoelectric cells. Switching from the first sensor panel to the second sensor panel is conducted once and the signal processing is conducted page by page. No switching noise occurs and the signal-to-noise ratio is improved.

Another object of the present invention is to provide an information input device in which the processing control means controls the first scanning means and the second scanning means so as to alternately scan a plurality of photoelectric cells of the first sensor panel and a plurality of photoelectric cells of the second sensor panel.

According to the above mentioned device, it is possible to provide an information input device which is capable of reliably controlling locations of information on both sides of the document. When inputting information from a document whose size is smaller than the surface of each sensor panel, the device scan only necessary part of the document and stop without conducting waste scanning.

Another object of the present invention is to provide an information input device in which the processing control means controls the first light source and the second light source so as to turn ON the first light source and turn OFF the second light source when scanning a plurality of photoelectric cells of the first sensor panel and to turn ON the second light source and turn OFF the first light source when scanning a plurality of photoelectric cells of the second sensor panel.

According to the above mentioned device, each light source can be turned ON only when it is needed to use. This eliminates such a problem that unnecessary light from an unnecessary light source passes through a document and erroneously increases the reflected light from the document. The S/N-ratio of output signals of the device can be improved.

BRIEF DESCRIPTION OF THE DRAWINGS

FIG. 9 is a schematic illustration of a signal processing portion of an information reading portion.

FIG. 10 is a schematic illustration of another signal-processing portion of an information reading portion.

FIGS. 26(A) and 26(B) are views showing the structure of an information input device embodying the present invention.

PREFERRED EMBODIMENT OF THE INVENTION

Figure 1:
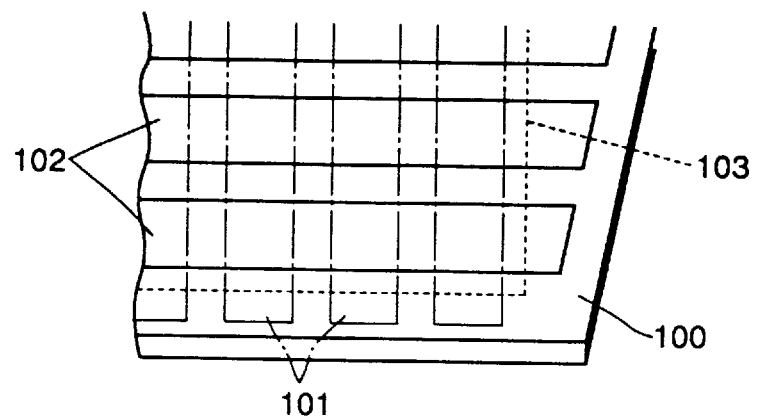
FIG. 1 is a plan view showing the structure of a conventional information reading device.

Japanese Patent Publication No. 4-52485 proposes a two-dimensional information reading device, shown in FIG. 1, wherein photoelectric cells formed in two-dimensional matrix serves as light-sensitive elements for optically inputting character-and-graphic information. In FIG. 1, numeral 100 is a glass substrate whereon a sintered CdS (cadmium sulfide) layer 101 is formed in stripes which works as electrodes for detecting an X-coordinate value and as a n-type semiconductor of a photoelectric cell. A layer of sintered CdTe (cadmium Tellurium) 102 is formed in stripes over the sintered CdS layer 101 at a normal angle of stripes. This layer works as a p-type semiconductor of a photoelectric cell with nodes of the CdS stripes 101 with sintered CdTe stripes 102 being photoelectric cells. A carbon electrode layer 103 is formed over the sintered CdS layer 102, which works as electrodes for detecting y-coordinate values and as doping material to the sintered CdTe 103. Each point of intersection of the sintered CdS layer 101 and the carbon electrode layer 102 represents a photoelectric cell.

In a reference book "Sensor and signal processing," (2nd ed., 2nd print, Kyoritu Publishing Co., 1989, p. 170 et. seq.), there is described how to use a coordinate input device which is, by way of example, constructed by using photodiodes.

Figure 2:
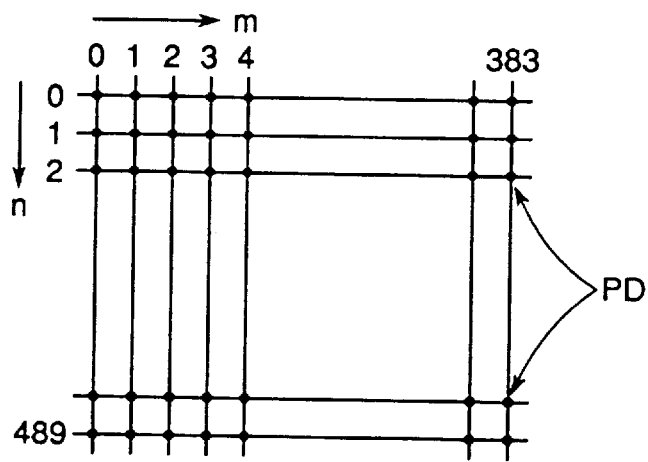
FIG. 2 is a plan view showing the structure of another conventional information reading device.

Referring to FIG. 2, two-dimensional photodiodes are scanned first from an element (n, m)=(0, 0) to an element (0, 383), next from an element (1, 0) to an element (1, 383) and further are scanned in similar way to a last element (489, 383) to detect a photodiode which light enters.

Referring now to the accompanying drawings, preferred embodiments of the present invention will be described below in detail.

Figure 3:
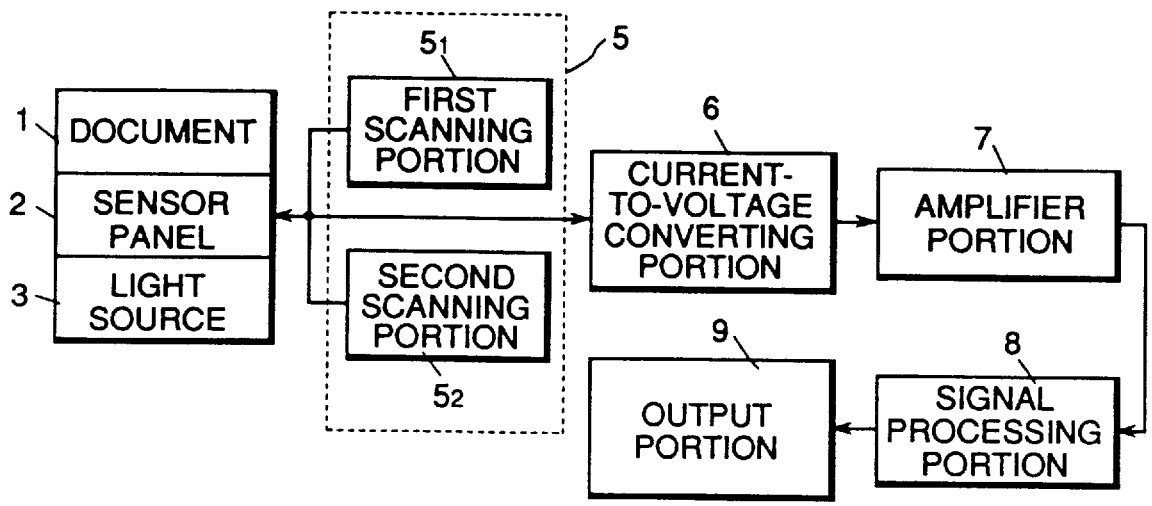
FIG. 3 is a block diagram showing the structure of an information reading device embodying the present invention.

FIG. 3 is a block diagram showing the electric hardware structure of an information reading device embodying the present invention.

As shown in FIG. 3, a document sheet 1 with character-and-graphic information written thereon is placed with written surface down on a top surface of a sensor panel 2. A light source 3 for emitting light radiation to the document 1 is made integrally in layers with the sensor panel for recognizing information by detecting reflected light from the document 1. Furthermore, the sensor panel 2 is provided with a first scanning portion $5_1$ connected thereto for horizontally scanning two-dimensionally arranged photoelectric cells of the sensor panel 2 and a second scanning portion $5_2$ connected to the sensor panel 2 for vertically scanning the photoelectric cells of the sensor panel 2. A current-to-voltage converting portion 6 converts output current of each photoelectric cell of the sensor panel 2 to a voltage signal suitable for further processing. The obtained voltage signal is amplified by an amplifier portion 7 so as to make it easier to process. A signal processing portion 8 performs operations on the voltage signal so as to enable it to reproduce the character-and-graphic information of the document 1. The processed signal is outputted by an output portion 9.

Figure 4:
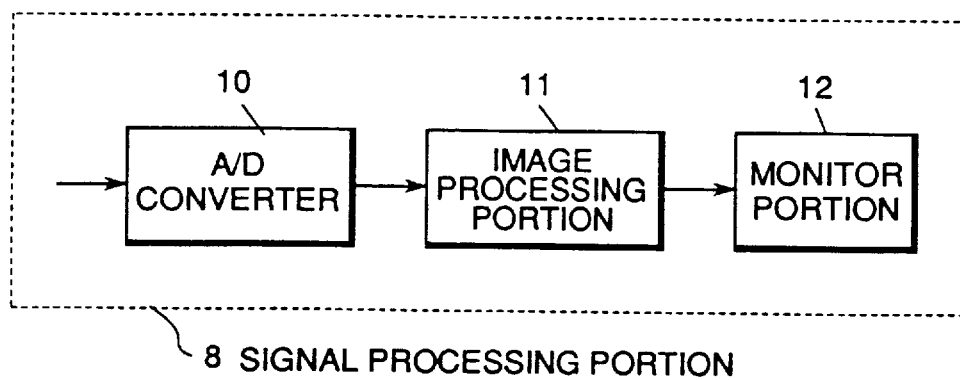
FIG. 4 is a block diagram showing details of a signal processing portion of FIG. 3.

The signal processing portion 8 can be constructed, as shown for example in FIG. 4, of an A/D converter 10 for converting analog signals into digital, an image processing portion 11 for processing digital signals to reproduce image information and a monitor portion 12 for recognizing a reproduced image. A small-sized information reading device using a sensor panel having a plurality of photoelectric cells arranged in two-dimensional matrix can be thus realized.

The structure of the above-mentioned sensor panel will be described below in detail with reference to FIGS. 5 to 7.

Figure 5:
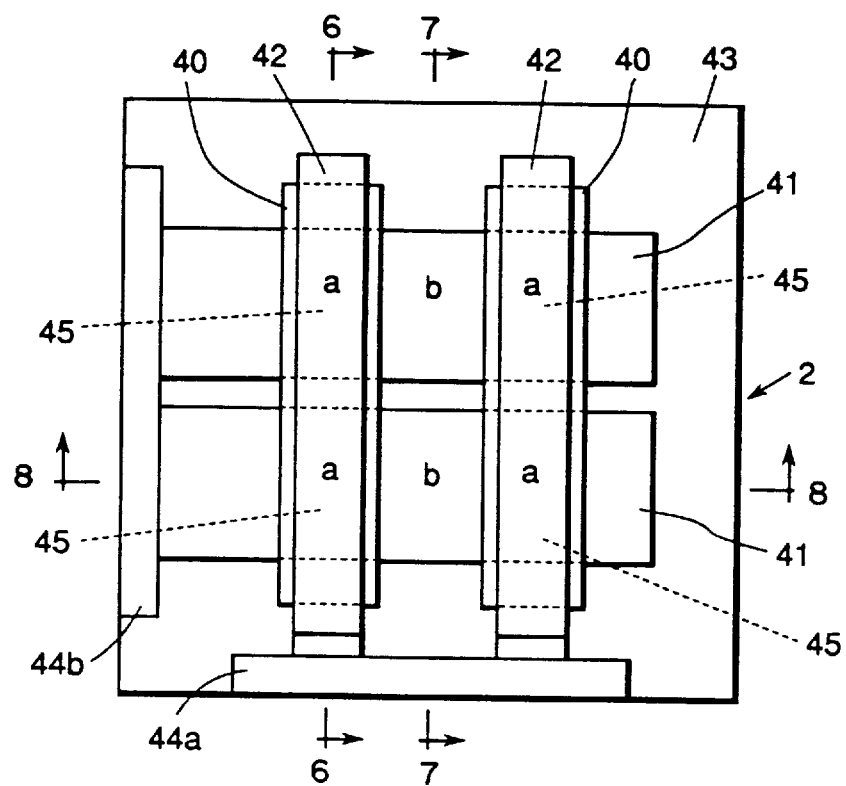
FIG. 5 is a plan view of a sensor panel of an information reading device embodying the present invention.

FIG. 5 is a plan view of a two-dimensional matrix sensor panel. FIG. 6 is a section taken on line A–A' of FIG. 5 and FIG. 7 is a section taken on line B–B' of FIG. 5. In FIGS. 5 to 7, numeral 43 designates a transparent substrate made of, e.g., glass and numeral 41 designates a first layer of electrodes made of material (e.g., ITO) having high-transmissivity and formed in the form of stripes on the transparent substrate 43. The transparent substrate 43 has the first layer striped electrodes 41 formed thereon, an amorphous silicone layer 40 formed in stripes disposed orthogonally to the first-layer striped electrodes 41 and a second-layer striped electrodes 42 made of material (e.g., nickel) having low transmissivity and laid over the amorphous silicone layer. The transparent substrate 43 is at its end portion with terminals 44a and 44b.

In section A–A' (FIGS. 5 and 6), there are shown stripes of electrodes 41, stripes of the amorphous silicone layer 40 and stripes of the second-electrodes 42, which are formed in layers in the described order on the transparent substrate. Accordingly, a photoelectric cell is formed as an two-dimensional matrix block "a" whereat the first-layer electrode 41 and the second-layer electrode 42 intersect.

In the section B–B' (FIGS. 5 and 7), only first-layer striped electrodes 41 are formed on the transparent substrate 43. Accordingly, only a first-layer electrode 41 made of material having high-transmissivity exists as a block "b" in the section B–B' on the substrate. The transmissivity of this block "b" is therefore higher than that of the block "a" in the section A–A'. If the first-layer electrodes 41 are made of a transparent material such as ITO, its transmissivity can be increased to about 80%. In this case, the transmissivity of the block "b" may be 75% if the transparent substrate 43 made of glass having transmissivity of about 95% is used.

Figure 7:
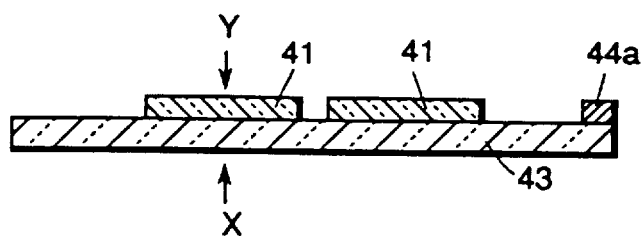
FIG. 7 is a section taken on line B–B' in FIG. 5.

Referring to FIG. 7, incident light X enters the transparent substrate 43, passes the block "b" (FIG. 5) (i.e., the transparent substrate 43 and the first electrode 41) and comes out from the opposite surface. Namely, the block "b" has satisfactory high transmissivity.

Figure 6:
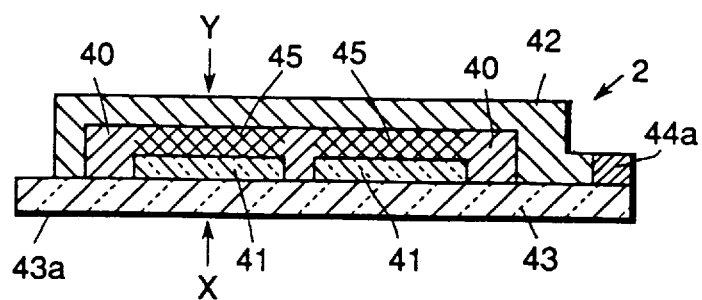
FIG. 6 is a section taken on line A–A' in FIG. 5.

On the other hand, light having entered the block "a" (FIG. 5) i.e., where the first-layer electrode 41, the amorphous silicone layer 40 and the second-layer electrode 42 are laid in the described order, can not pass into the opposite side irrespective of its entering direction X or Y (FIG. 6). This is because light is shut off by the second-layer electrodes 42 of low transmissivity.

A photoelectric cell 45 is thus formed in two-dimensional matrix at the place "a" whereat the first electrode 41 and the second electrode 42 intersect at a right angle.

The amorphous silicone layer 40 has a very low conductivity in horizontal direction. Accordingly, a photoelectric cell 45 is formed only at a place "a" whereat the first-layer electrode 41 and the second-layer electrode 42 even if stripes of the amorphous silicone layer 40 continue to each other. Therefore, photoelectric cells neighboring through an amorphous silicone layer strip so scarcely leak as if they may be completely insulated from each other.

A method for forming electrode layers and an amorphous silicone layer on a transparent substrate, which was not described hereto particularly, may be such that a thin film is formed by using CVD (Chemical Vapor Deposition) equipment and then etched in any suitable way. The amorphous silicone layer is may be formed on the first-layer electrodes in the order of p-type semiconductor, insulating layer and n-type semiconductor or n-type semiconductor, insulating layer and p-type semiconductor. Both procedures may bring similar function. In short, it is essential to form a photoelectric cell at a point where the first-layer electrode and the second-layer electrode intersect.

Needless to say, the sensor panel shown in FIG. 5 has 4 photoelectric cells but is not limited thereto. It may be composed of a large number of matrix-like formed photoelectric cells, e.g., more than 1000.

Referring to FIG. 6, the photoelectric cell 45 does not respond to light having entered from the second-layer electrode 42 of low transmissivity while it produces a photo-electromotive force in respond to light having entered the first-layer electrode 41 of high transmissivity through a surface 43a of the transparent substrate 43 by reason of the difference of the transmissivities of the two electrodes 41 and 42.

Figure 8:
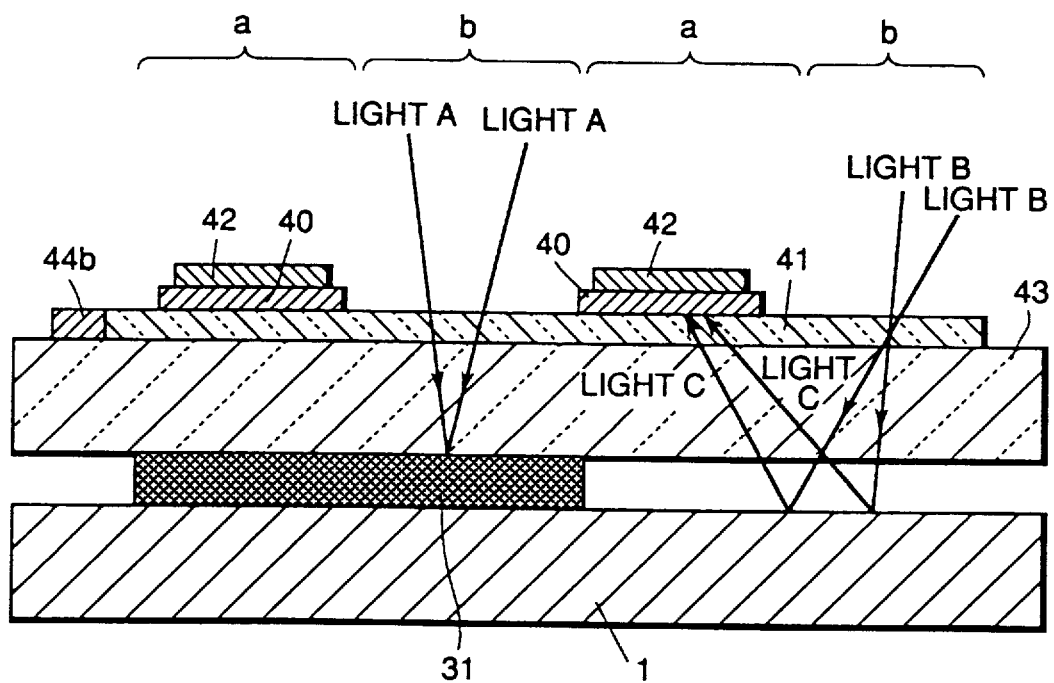
FIG. 8 is a large-scaled sectional view taken on line C–C' in FIG. 5.

Now, it will be explained below how to read information by an information reading device according to the present invention with reference to FIG. 8 which is a larged-scale sectional view taken along line C–C' of FIG. 5.

A document 1 to be read is first closely put onto the surface of a transparent substrate 43. This document 1 is supposed to contain information written with, e.g., ink 31 thereon. Blocks "a" and "b" shown in FIG. 8, are the same as described in FIG. 5: the block "a" does not transmit light whereas the block "b" allows light to pass. When light A and light B enter the sensor panel through its surface opposite to the panel surface whereto the document 1 is attached, the light A and the light B pass blocks "b" of the first-layer electrode 41 and the transparent substrate 43 and strikes the surface of the document 1. At this time, the light A that illuminated a written part of the document surface (i.e., with character-and-graphic information) is almost absorbed by the ink 31 and is scarcely reflected therefrom. On the contrary, the light B that illuminated a blank part of the document surface 1 rebounds back therefrom as strong light C of reflected light. The reflected light C is detected by a photoelectric sensor which produces a current signal being proportional to the intensity of the illumination. The information written on the document is thus read.

Figure 11:
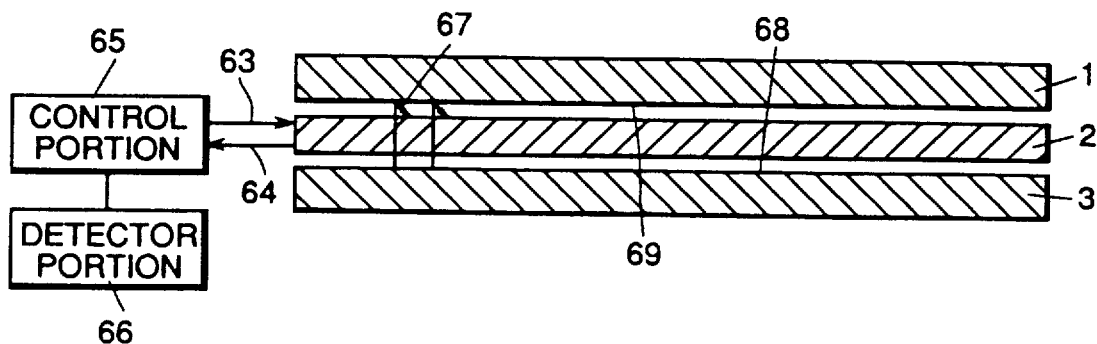
FIG. 11 is a sectional view showing an arrangement of a sensor panel and a light source in an information reading device.

FIG. 11 shows relative positions of a sensor panel 2, a light source 3 and a document 1 to be read. The arrangement of the sensor panel 2 and the document 1 shown in FIG. 11 is reverse to that shown in FIG. 8. Namely, The sensor panel 2 is placed with its transparent substrate 43 up. A panel type light source 3 is used for illuminating the sensor panel 2. A control portion 65 generates scanning signal 63 and gets data signal 64, controlling a plurality of photoelectric cells. A detecting portion 66 performs processing data to reproduce information. To obtain a sharp image, it is of course necessary to keep the sensor panel 2, the light source 3 and the document 1 should be in close contact with each other.

The operation of the above-mentioned device is as follows:

The light source 3 specially used for reading information from the document 1 emits even surface light toward the surface of the document 1. The incident light passes the sensor panel 2 and strikes the document surface, then it rebounds back from the document 1 into the sensor panel 2. When the document 1 is, for example, a sheet of paper with information written with black ink thereon, it causes a part of the reflected light from a written portion of the document surface weaken than a part of the reflected light from a white (blank) portion of the document surface because the black portion and the white portion of the paper sheet have different reflectance values as described before with reference to FIG. 8. Consequently, the photoelectric cells of the sensor panel 2 produce different current outputs. The differential current signals of the photoelectric cells are converted by the current-to-voltage converting portion 6 (FIG. 3) to corresponding voltage signals which are then amplified by the amplifying portion 7 (FIG. 3). The signal processing portion 8 (FIG. 3) digitizes the level values of the amplified voltage signals and further processes them to reproduce information of the document 1.

The sensor panel 2 consists of a plurality of photoelectric cells and allows two-dimensional scanning in X-Y directions with the first electrodes 41 and the second electrodes 42 as shown in FIG. 5. Accordingly, information image elements on the document 1, which are opposite to the respective photoelectric cells to be scanned, are sequentially read as current signals.

The information reading device is constructed of the above-mentioned reading system which is provided with the special light source 3 capable of evenly illuminating the sensor panel 2 and can read information of the document 1 by sequentially scanning a plurality of the photoelectric cells two-dimensionally arranged in the sensor panel 2. This device, therefore, does not requires any mechanism for moving sensor portion for scanning a document or transporting the paper along the sensor portion that the prior art device needs. This makes it possible to realize a very simple information reading device which is also free from noise and vibration that the conventional mechanical scannin may produce.

Referring to FIGS. 9 and 10, the further processing operations of the signal processing portion 8 will be described as follows:

Referring to FIG. 9, a signal processing portion 50 digitizes a sequence of signals from the sensor panel 2 and transfers the digitized data to a computer 51 which in turn performs image processing operations on the received digital signals and stores image information data into a disk memory 52. The content of the memory can always be read out to an output device 53 allowing outputting the same information as read from the document at any desired time on the output device. Referring to FIG. 10, a signal processing portion 50 transfers digitized data signals of the sensor panel 2 to a video-signal converter 54 which in turn converts the received digital signals into video-signals and outputs the video signals to a television monitor 55 to display a restored image. The output of the television monitor is connected to a video deck 56 for recording the image on a VTR tape 57. The output of the television monitor is also connected to an external video printer 58 for printing out the information.

As described above, the information reading device according to the present invention has no need for mechanically moving its sensor or a document for image scanning and, therefore, can be made of portable type that has an exceedingly small thickness and size.

The above-mentioned embodiment of the present invention, however, involves the following problems:

When external light falls from the upper side to the document 1 placed on the top surface of the sensor panel 2, it may penetrate the document 1 and be added to reflected light from the document 1, resulting in disturbance of outputs of the photoelectric cells. If the document 1 moved a small distance on the sensor panel during scanning the photoelectric cells, matching is lost between a matrix of the photoelectric cells and information of the document. Current outputs of the photoelectric cells are affected and can not represent correct information. Furthermore, output current of each photoelectric cell has a very small value of nano-order and can easily be affected by an external noise. Particular affection may have on the sensor panel 2 and the current-to-voltage converting portion 6.

Figure 12A:
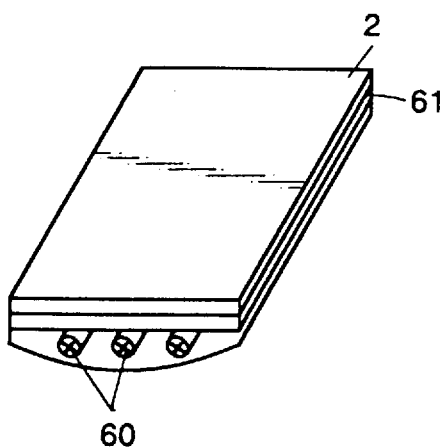
FIGS. 12(A) and 12(B) are perspective illustrations of an exemplified light source in an information reading device.
Figure 12B:
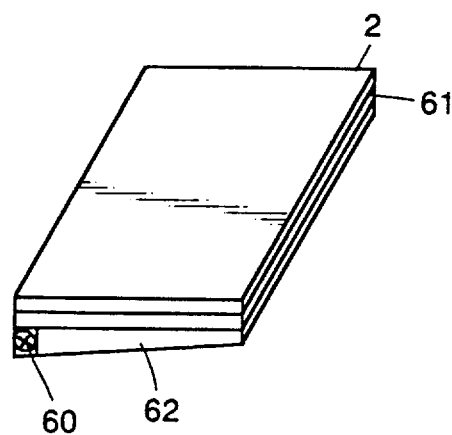

Accordingly, a second embodiment is devised to solve the above-mentioned problems as follows:

FIG. 11 shows an information reading device which obtains information by detecting reflected light 67 from a document 1 whereon character-and-graphic information is written. A light source 3 for illuminating the document 1 to read image information consisting of characters and/or graphics is a thin flat type single-surface light-emitting source whose light-emitting surface 68 has a superposed thereon sensor panel 2 consisting a two-dimensional matrix of photoelectric cells shown FIG. 5. The document 1 is placed with its written surface 69 down on the upper surface of the sensor panel 2. Light-emitting diodes (backlight LED) and electroluminescence elements (backlight EL) are available for use as elements of the flat surface light source 3. As shown in FIGS. 12(A) and FIG. 12(B), a luminescent lamp 60, which is a cold cathode-ray tube (or a hot cathode-ray tube) usually used as a backlight of a liquid crystal panel, may also be applied as the light source 3. FIG. 12(A) shows an information reading portion which includes a light-source consisting of a plurality of parallel arranged luminescent lamps 60 and a sensor panel 2 with a diffusing plate 61 sandwiched therebetween. FIG. 12(B) illustrates an information reading portion which uses a single luminescent lamp 60 wherefrom light is conducted through a light-conducting plate 62 into a diffusing plate 61.

Although the document 1, the sensor panel 2 and the light source 3 are spaced in illustration of FIG. 11, they must be in close contact with each other in practice. Otherwise, stable signals can not be obtained.

Figure 13:
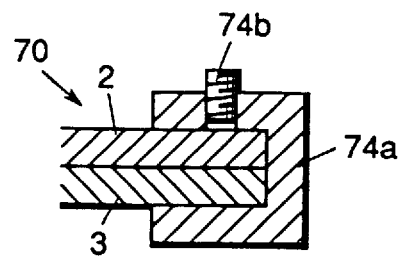
FIG. 13 is a sectional view of an end part of a reading portion of an information reading device.
Figure 14A:
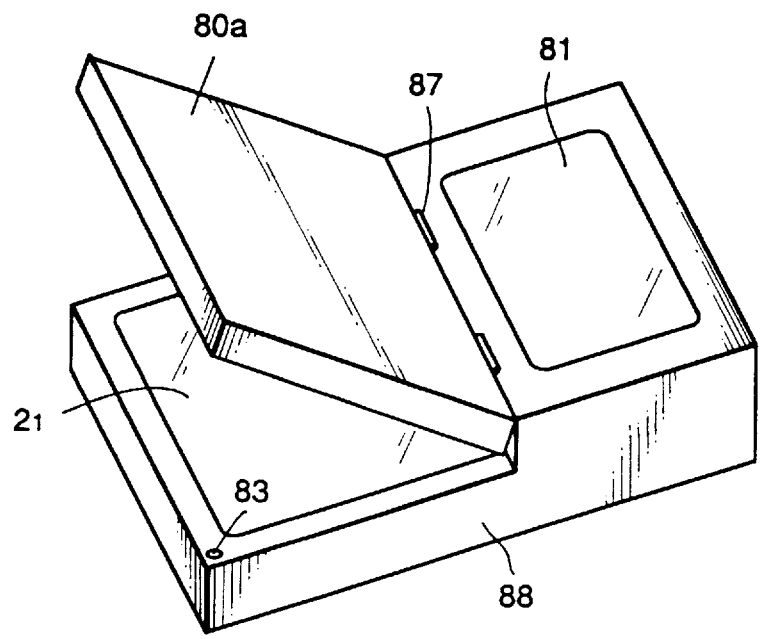
FIGS. 14(A) and 14(B) are a perspective view and a side view of a hingeconnection between a cover and a cabinet of an information reading device.

In the second embodiment, a sensor panel 2 and a light source 3 are fixed together in a fixing frame 74a with, e.g., a hexagonal screw 74b as shown in FIG. 13. A reading portion 70 wherein the light source 3 and the sensor panel 2 are thus integrally laminated in fixed frame 74a is mounted in a cabinet 88 as shown with broken lines in FIG. 14(B). FIG. 14(A) is a perspective view of the embodiment of FIG. 14(B) when seen at an angle from an upper view-point. A document 1 is to be placed on a surface $2_1$ of the sensor panel 2 of the reading portion 70. The light source 3 emits light toward the sensor panel surface $2_1$ from the bottom upwards in the cabinet 88. The document 1 shall be placed on the top surface $2_1$ of the sensor panel in such a way that it is attached tightly and reliably (not to move) to the sensor panel surface $2_1$. For this purpose, a cover 80a is closed to press the document onto the sensor panel surface $2_1$ from the top side. The cover 80a is preferably provided with a flexible sheet-like inner lining 82 for further stably holding the document 1 on the sensor panel surface $2_1$. The flexible lining 82 is preferable to have electro-conductivity to exert shielding effect against an electrostatic noise. The document can be accurately read on the embodiment by holding the document 1 tightly and stably on the sensor panel 2 with the cover 88a. The document 1 is illuminated with only incident light from the light source 3 since the cabinet 88 and the cover 88a cooperate to form as shielded box completely shutting off the outside light. Consequently, output signals from the photoelectric cells are prevented from varying with addition of the external noise light. The document 1 with folds can be straightened by pressing the flexible lining 82 of the cover 80a.

The cover 80a is at its end turnably attached with a hinge 87 to the cabinet 88 and can hold always stably the document 1 on the sensor panel. The cover 80a can smoothly open and close by simply turning it about the hinge-coupled end. This also eliminates the possibility of displacement of the cover 80a causing the document 1 to move out of the matched position. The cover 80a for pressing the document is preferable to be attached to the cabinet 88 for realizing a portable device. It is most desired to provide the cabinet with a display panel 81 as shown for example in FIG. 14(A). This display panel 81 is intended to reproduce image information consisting of characters and graphics taken through the sensor panel surface $2_1$ from the document 1. It is preferable to start reading the document 1 after confirmation of completely closing the cover 80a by using a closed-cover sensor 83.

Figure 15A:
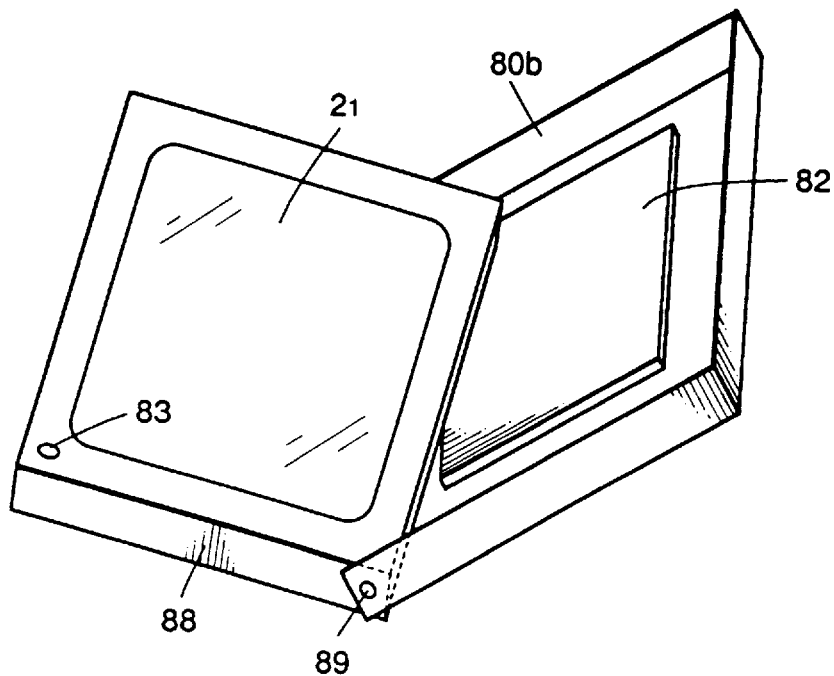
FIGS. 15(A) and 15(B) are a perspective view and an enlarged perspective view of another hinge connection between a cover and a cabinet of an information reading device.
Figure 15B:
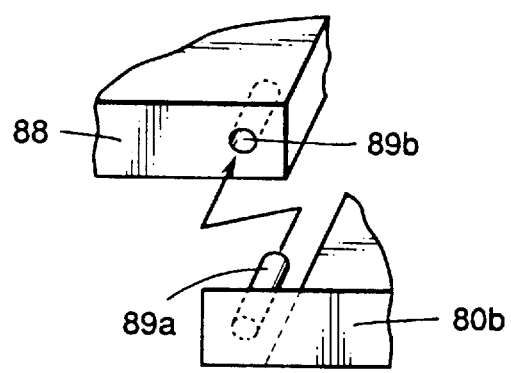

Refer ring to FIGS. 15(A) an d 15(B), another embodiment with a cover turnably attached thereto is described as follows:

FIG. 15(A) shows a cover 80b which is turnably supported at its both ends with shaft bearing portions 89 on a cabinet 88. The shaft bearing portions 89 are made by forming plugs 89a one at each end of the cover 80b and by making sockets 89b one in each end of the cabinet 88. The plugs 89a of the cover 80b are rotatably supported in the corresponding sockets 89b of the cabinet. The cover 80b can be turned and cover the cabinet 88. In this instance, it is preferable to provide the cover 80b with flexible lining 82 for firmly holding the document 1 on the cabinet. It is also desired to provide the cover 80b with a closed-cover sensor so that the device can start reading the document after detecting the cover 80b in completely closed state.

A room under the sensor panel surface contains fluorescent lamps 60 shown in FIGS. 12(A) and 12(B). The sensor panel 2 is superposed on a light diffusing plate 61 disposed above the fluorescent lamps 60. Backlight light-emitting diodes (LED) or electroluminescence elements (EL) can be also used. Light-emitting diodes are drivable with a low voltage of 5V (at TTL level) and therefore have no influence on the quality of processing signals from the sensor panel. Furthermore, the light-emitting diodes does not require any peripheral emitting circuit. The used light-emitting diodes compose a surface LED display that is capable of evenly emitting light from an entire surface of a large working area and is drivable with a typical voltage of 4.2V and a maximum voltage of 6V. Application of the LED type light source is effective to save the overall size of the device and to reduce noise to t he sensor panel 2.

The EL type light source is feature d by its high luminosity enough to taking a large output signal of the sensor panel but requires a high driving voltage of about 100V that may produce noise signals. Therefore, the information reading device with the EL type light source must include means for shielding the entire device system. However, the EL type light source in comparison with a light source consisting of a cold or hot cathode-tube type luminescent lamps and an LED type light source has a smaller size (in thickness) and is easy to be tightly superposed on a sensor panel assuring effective use of even weak light with minimized leakage of light. Application of the EL type light source makes it possible to detect a signal from the sensor panel even at a reduced quantity of light with a derived effect of allowing a driving voltage to be decreased.

Figure 16:
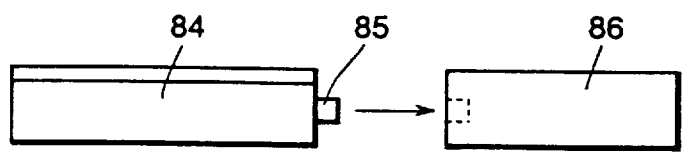
FIG. 16 is a side view showing a relationship between a main body and display of an information reading device.

FIG. 16 shows a device which is composed of two separable units, one of which is a main body 84 consisting mainly of a light source 3 and a sensor panel 2 and the other one of which is a display unit 86 consisting mainly of a signal processing portion and a display panel. This design can reduce the size of the main body and the display portion 86 to be easier to transport as well as makes it possible to display obtained information at any desired time if the main body is assembled with the display unit at the site. The main body 84 and the display unit 86 are connected to each other with a connector 85. It is also possible to interconnect them by using a cable or the infrared-ray communication technique. Any of the above-mentioned connecting methods can be used. It is preferable to design with due consideration of interchangeability so as to use with different kinds of units.

The above-described embodiments, however, encounter such a problem that the cover can not be closed when reading a document whose surface is larger than the top surface of the sensor panel or a very thick document.

The third embodiment of the present invention is intended to solve the above-mentioned drawback. Namely, it is a portable type information reading device which is capable of reading a large-size document.

Figure 17:
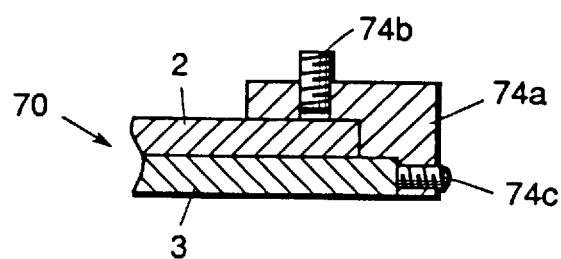
FIG. 17 is a sectional view of an end part of a reading portion of an information reading device.

Referring to FIG. 17, a sensor panel 2 consisting a two-dimensional matrix of photoelectric cells and a light source 3 for illuminating a document 1 are superposed on each other and fixed tightly as a single-piece in a fixing frame 74a with using screws 74b and 74c. The fixing frame 74a is flush with the surface of the light source 3. The reading portion 70 is connected by a cable to a signal processing portion for processing signals from the sensor panel 2. The reading portion 70 is thus separated from the signal processing portion and connected with the latter by using a cable.

Figure 18A:
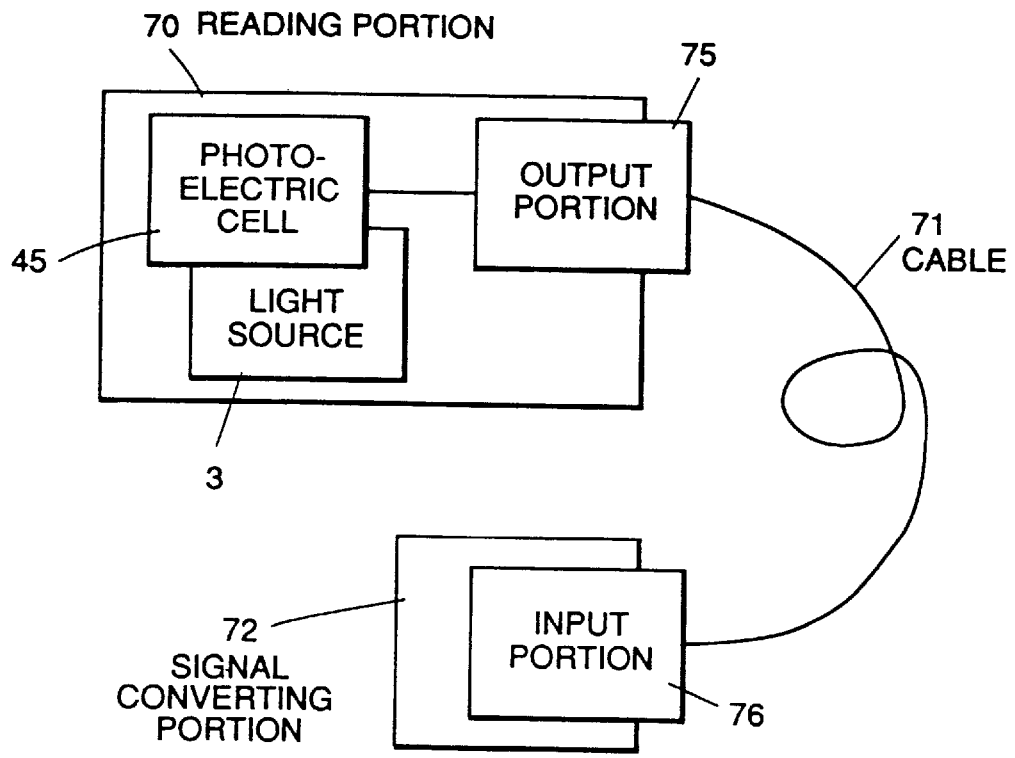
FIGS. 18(A) and 18(B) are a block diagram and a perspective view showing a relationship between a reading portion and a signal converting portion in an information reading device.
Figure 18B:
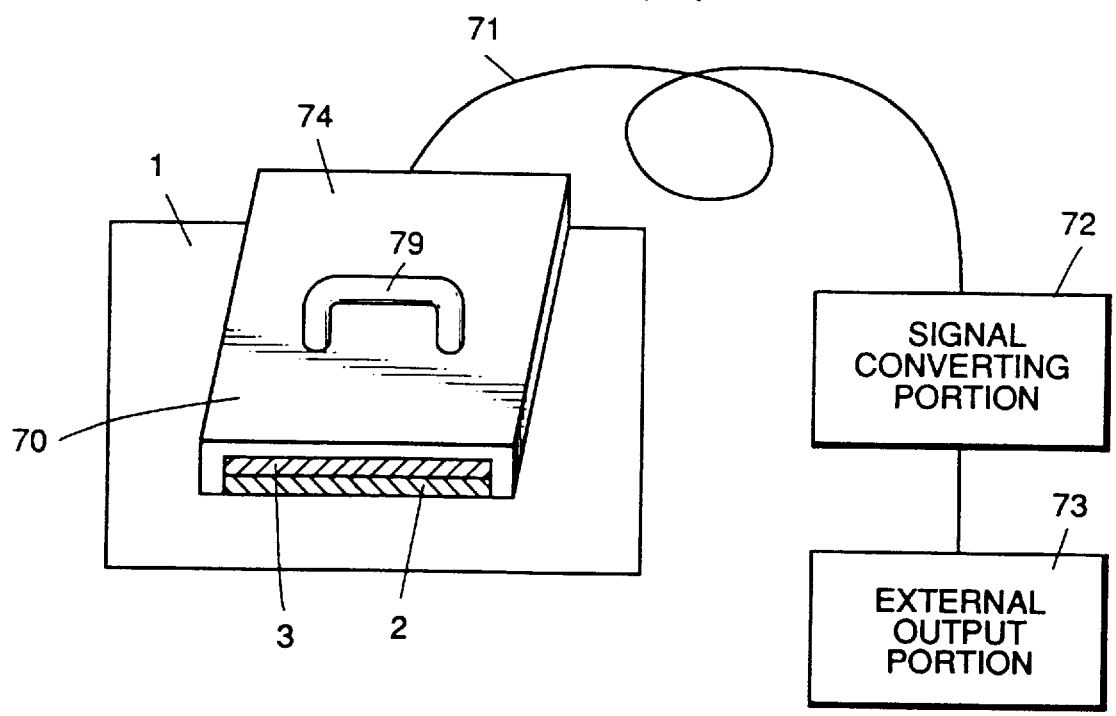

Referring to FIGS. 18(A) and 18(B), the third embodiment will be described below in detail.

FIG. 18(A) is a construction view of the third embodiment of the present invention. A sensor panel 2 with a matrix of photoelectric cells 45 and a light source 3 are fixed together by fixing means shown in FIG. 17 to form a reading portion 70 which is provided with an output portion 75 for outputting a signal from the sensor panel 2. An output signal from the output portion 75 of the reading portion 70 is transmitted by a cable 71 to an input portion 76 of a signal converting portion 72 for processing the received signal. The reading portion 70 and the signal converting portion 72 are separated from each other and connected to each other by using the cable 71. This design enables the reading portion 70 to freely move.

FIG. 18(B) is illustrative of how to use the information reading device constructed as shown in FIG. 18(A). The sensor panel 2 fixed by the fixing parts 74 can read a document 1 whose surface is larger than the surface of the reading portion. The device can be held by its handle 79 and manually moved to the desired position within the length of the cable 71 from the signal converting portion 72. In the shown case, only the reading portion 70 is put on the document 1 whereas the signal converting portion 72 is disposed at a distance therefrom. The signal converting portion 72 can be provided with an output portion 73 such as a printer, a monitor and so on. A portable type information reading device that is very easy to use is thus realized.

Figure 19:
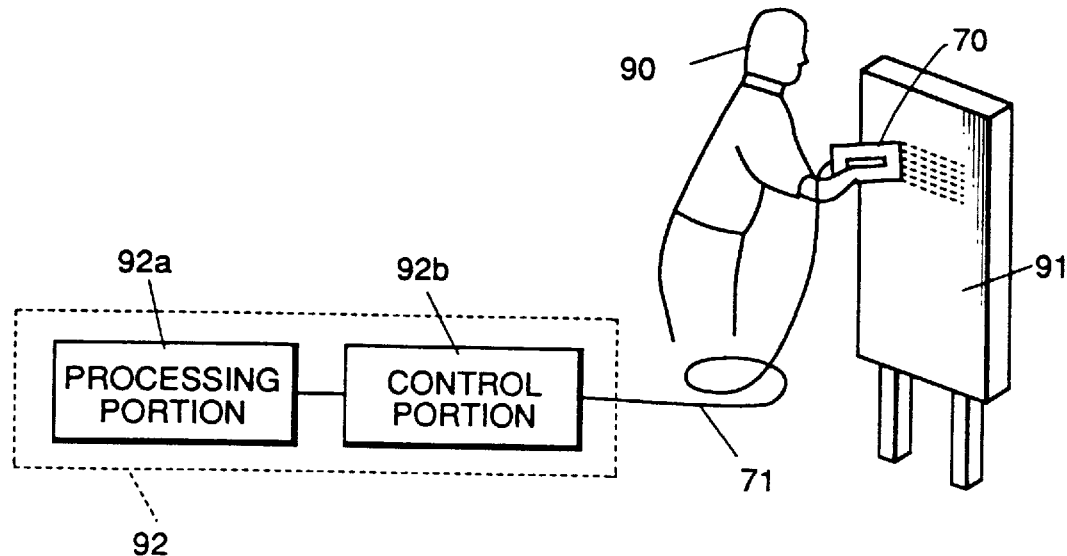
FIG. 19 is a view for explaining how to use an information reading device when reading a cubic structure.

The device has no need to move the reading portion 70 along the surface of the document 1 while reading the document 1. In other words, the device can read information from the document 1 in two-dimensional direction through its reading portion which is only placed still on the document 1. Furthermore, the device can read information from other material than paper, for example, information written on a space structure, e.g., an advertising board 91 as shown in FIG. 19. A user 90 holds by hand the reading portion 70 including the sensor panel 2 integrally coupled with the light source 3 and brings its surface to touch with the advertising board wherefrom the reading portion reads information. Scanning of the reading portion is controlled from a control portion 92b which together with a processing portion 92a comprises a main body 92 of the device. This main body is separated from the reading portion 70 and connected therewith by using a cable 71. A signal from the reading portion 70 is processed by the processing portion 92a.

The information reading device thus constructed can attain an increased portability. Namely, the device is designed as a combination of the reading portion 70 and the main body 92 to widen the field of its application. The main body 92 may be any one of a word processor, a personal computer, a portable type terminal device, a pocket computer, an electronic calculator and a wrist watch in the case if it contains necessary facilities.

Figure 20:
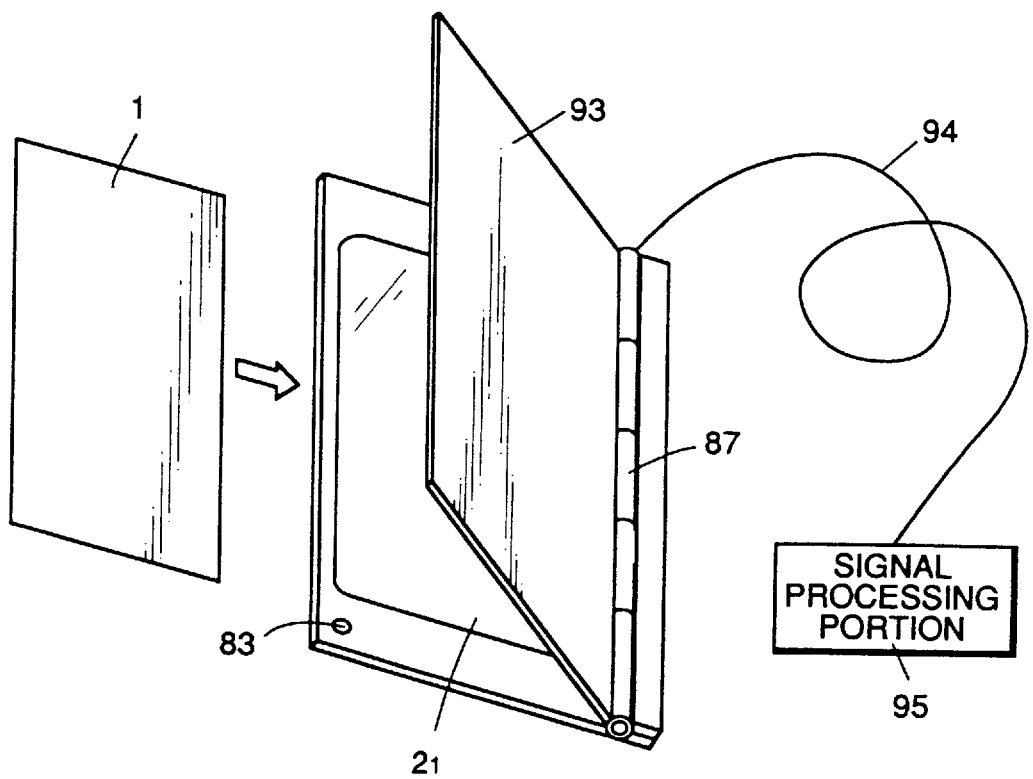
FIG. 20 is a perspective view of a note type information reading device.

FIG. 20 is illustrative of a note-type information reading device of most simple construction, which is a fourth embodiment of the present invention.

An experimental model could not mount a signal processing portion in a portable type pocket computer (called "electronic notebook") 93 and made said portion as an external unit with shield wiring 94. However, it is possible to mount the signal processing portion in the pocket computer. The shown device uses shield wiring 94 with an increased capacitance that may cause a signal to be slightly dull with an decreased sharpness. But the experimental model proved the possibility of putting a notebook-size portable type information reading device into practical use.

Figure 14B:
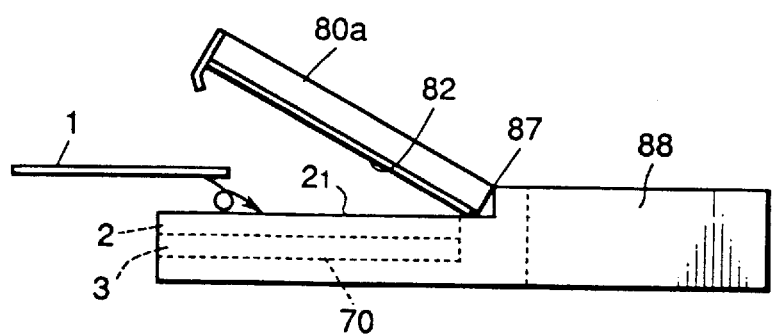

Furthermore, this notebook type information reading device can also be provided with prior art functions such as pocket computer functions, a tablet-pen-input function and a memory function. This information reading device can read a document only interposed between two flapper potions thereof as shown in FIGS. 14(A), 14(B) or FIG. 20. This is because the device has no need to mechanically move its reading portion or a document. The device may be applied as a pocket-portable type input terminal which could not realized by the prior arts. Namely, the device is a leading tool that can be effectively used as a two-dimensional sensor type input terminal of two-dimensional sensor and an pocket type input terminal for multimedia applications.

Figure 21A:
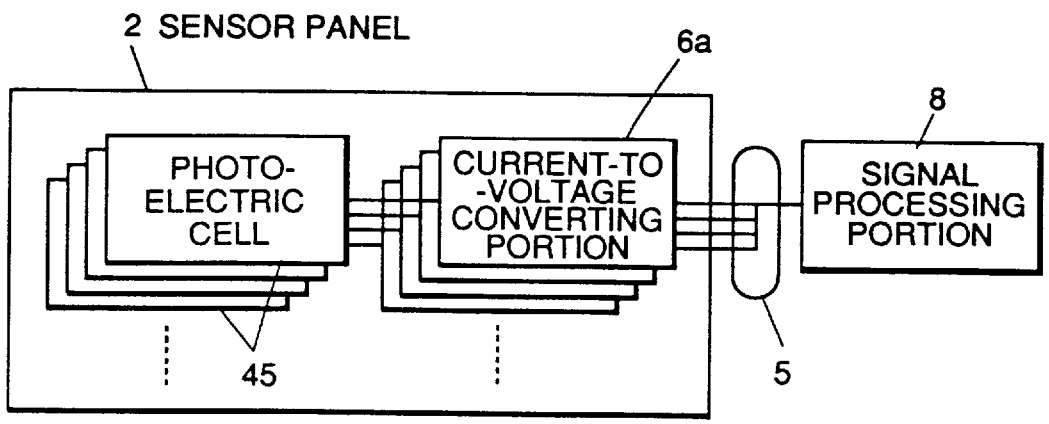
FIGS. 21(A) and 21(B) are block diagrams showing a relationship between a sensor panel and a signal processing portion in an information reading device.
Figure 21B:
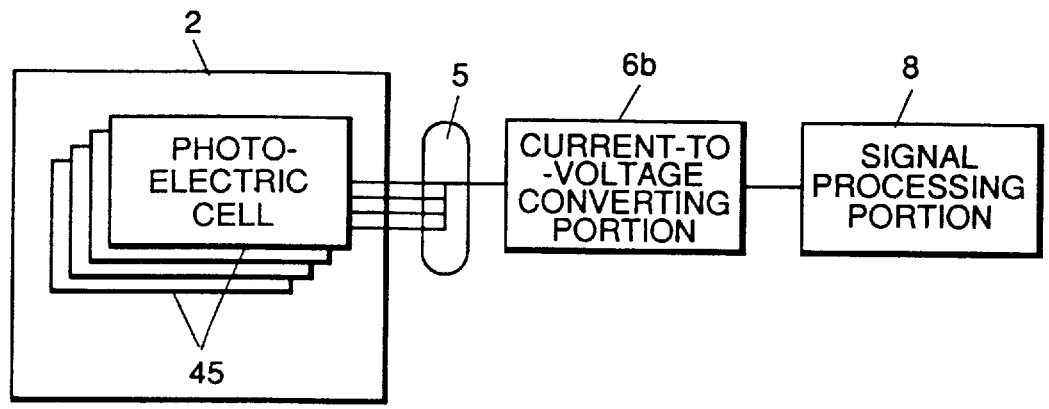
Figure 23:
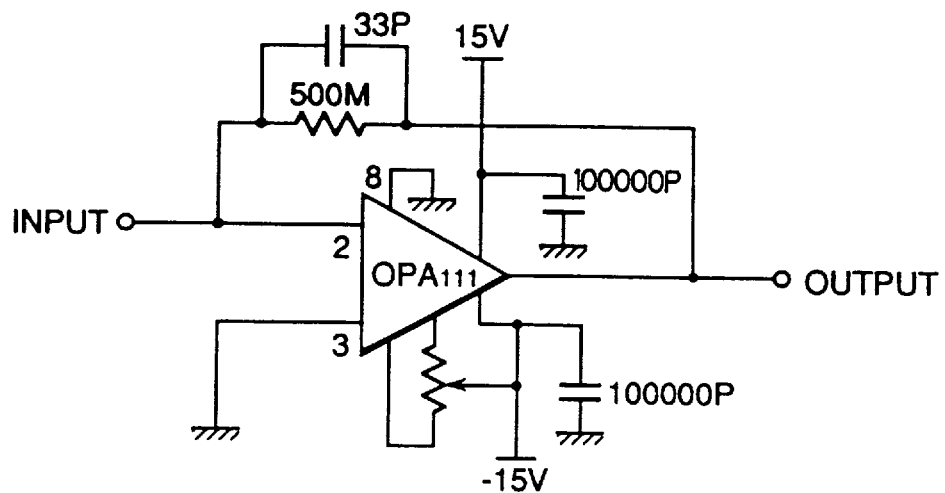
FIG. 23 is a practical circuit diagram of a current-to-voltage converting portion of an information reading device.

Referring to FIG. 21(B), an information reading device that is the fifth embodiment of the present invention has a current-to-voltage converting portion 6b disposed after a scanning portion 5 so as to first select by scanning photoelectric cells 45 within a sensor panel 2 and then convert outputs of the selected photoelectric cells 45 into corresponding voltage signals. By doing so, it becomes unnecessary to mount a plurality of current-to-voltage converters 6a as shown in FIG. 21(A), each consisting preamplifiers in a sensor panel 2 consisting of a plurality of photoelectric cells formed in a two-dimensional matrix. The sensor panel can be designed to be very simple and manufactured at a reduced cost. Furthermore, the application of one-piece constructed current-to-voltage converter 6b makes it possible to eliminate the necessity of providing a plurality of preamplifiers and omit unnecessary part of the substrate other than the photoelectric cells. This realizes considerable saving in size of the entire device. By separating the current-to-voltage converting portion 6b from the sensor panel 2, it becomes easier to design protection of the current-to-voltage converting portion 6b against noise signals that may be derived from a backlight disposed under the photoelectric cells. In other words, it becomes possible to separately shield the converter-amplifier circuits for converting a weak-current signal into a voltage signal and amplifying the converted signal independent from the sensor panel and/or to use a high-accuracy amplifier for a single current-voltage converting portion 6b. The current-to-voltage converting portions 6a and 6b shown in FIGS. 21(A) and 21(B) perform current-to-voltage conversion and amplification according to a circuit diagram shown in FIG. 23.

An amplifier circuit gain of the current-to-voltage converting portion 6b can be easily changed as the need be since the current-to-voltage converting portion made as a single separate unit and is not contained in the sensor panel 2 as shown in FIG. 21(B). In view of utilizing the above-mentioned advantages, the photoelectric cells 45, the scanning portion 5 and the current-to-voltage converting portion 6b are in series connected in the described order allowing current signals outputted from the photoelectric cells 45 to directly follow into the scanning portion 5.

An information reading system that was realized by combining components described in the preferred embodiments and could be put into practical use will be described below by way of an example of a practical application:

Referring to FIG. 9, a computer 51, a disk unit 52 and an output device 53 are arranged in the post-processing stage of signal processing portion 50. The signal processing portion 50 performs amplification and analog-to-digital conversion of signals received from the sensor panel 2 and transfers digitized data to the computer 51. In practice, a weak-current signal of 1 nA level from the sensor panel is converted and amplified to a voltage signal of $5 \times 10^8$ V/A (signal-to-noise ratio is not less than 48 dB). A signal of 0.5V is digitized by 16 bits and inputted into the computer 51. The computer 51 re-arranges a sequence of digital data according to the matrix of the photoelectric cells in the sensor panel 2. The data read from a document 1 is reproduced on a monitor display of the computer 51. The disk unit 52 and the output device 53 are used for recording the information read from the document 1. The shown system enables comparison of many pieces of data and reproduction of the selected data.

Another system can be constructed as shown in FIG. 10. In FIG. 10, an input signal from the sensor panel 2 is converted by a video-signal converter 54 into a video-signal that is then sent to a television monitor 55. The television monitor 55 restores an image from the received video-signal and displays the image on its display screen. The image data can also be printed out by using a video-printer 58 if need be.

An embodiment (not shown) that is intended to simply read and recognize information is provided with a storage oscilloscope for displaying waveform of signals processed by the signal processing portion 50. Information is written, for example, line by line into a memory in synchronized mode using a usually called "roll mode" function. Thus stored information, if it is simple and not complicated, can be reproduced by arranging lines from the matched stating points. It is possible to reproduce the information more clearly by averaging samples several times. This may, however, require more time for taking signals into the storage oscilloscope.

The above-mentioned embodiments use a sensor panel 2 consisting of a two-dimensional matrix of photoelectric cells 45 described with reference to FIGS. 5 to 7. The sensor panel consists of, e.g., photoelectric cells 45 composing a matrix of 128×128 dots. A flat type light source 3, which is used in liquid crystal display and can emit light in one direction, is disposed underneath the sensor panel 2 at a minimal distance therebetween. Although the abovementioned embodiments use a light source for illuminating from the bottom upwards an entire surface of the sensor panel 2, it is also possible to electrically scan the light source 3 to partly illuminate photoelectric cells 45 emitting signals in synchronism with electrical scanning the photoelectric cells 45 to detect signals therefrom. This requires the provision of means for scanning the light source and increases the number of circuits. Therefore, the abovementioned embodiments use the light-source for simultaneously illuminating an entire surface of the surface of the sensor panel. A special attention must be paid to the fact that with illumination of the entire surface of the sensor panel, it is necessary to adjust quantity of illuminating light in such a way that current signals from the sensor panel, which vary their intensity in response to illumination, can be linearly amplified by the amplifying portion 7 (FIG. 3) not to allow the amplified signal to exceed a specified power supply voltage of circuits composing the amplifying portion 7. In the embodiments, output current of one photoelectric cell in the sensor panel 2 is regulated within a range of 0.1 nA to 5 nA by adjusting a driving voltage of the light source. The minimum and the maximum of output current of each photoelectric cell represent white image information and black image information, respectively, of a document. Therefore, the light quantity of the light source is an essential parameter of the information reading device.

Scanning a matrix of photoelectric cells 45 in the sensor panel 2 (FIGS. 5 to 7) is conducted by using a multiplexor: a first scanning portion $5_1$ and a second scanning portion $5_2$ sequentially scan the photoelectric cells in horizontal direction and vertical direction, respectively, of the matrix. Output current signals from the sensor panel 2 are scanned directly by the multiplexor. The current-to-voltage conversion and signal amplification are conducted after the detectable photoelectric cells were selected by scanning. Namely, electrodes from respective photoelectric cells 45 of the sensor panel 2 are connected directly to the multiplexor shown in FIGS. 21(A), 21(B) and 22(A), 22(B).

Figure 22A:
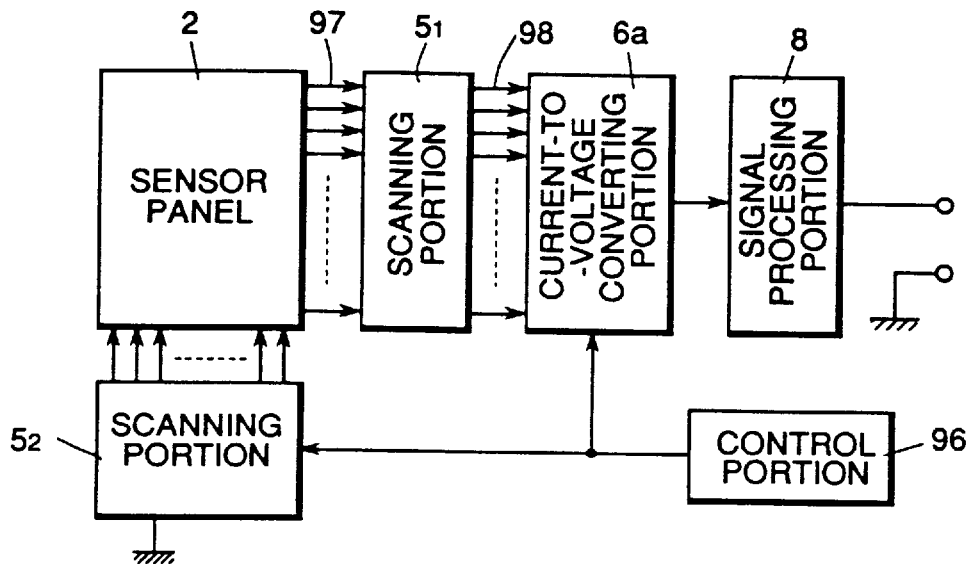
FIGS. 22(A) and 22(B) are block diagrams showing a relationship between a sensor panel, a current-to-voltage converting portion, a scanning portion and a signal processing portion in an information reading device.
Figure 22B:
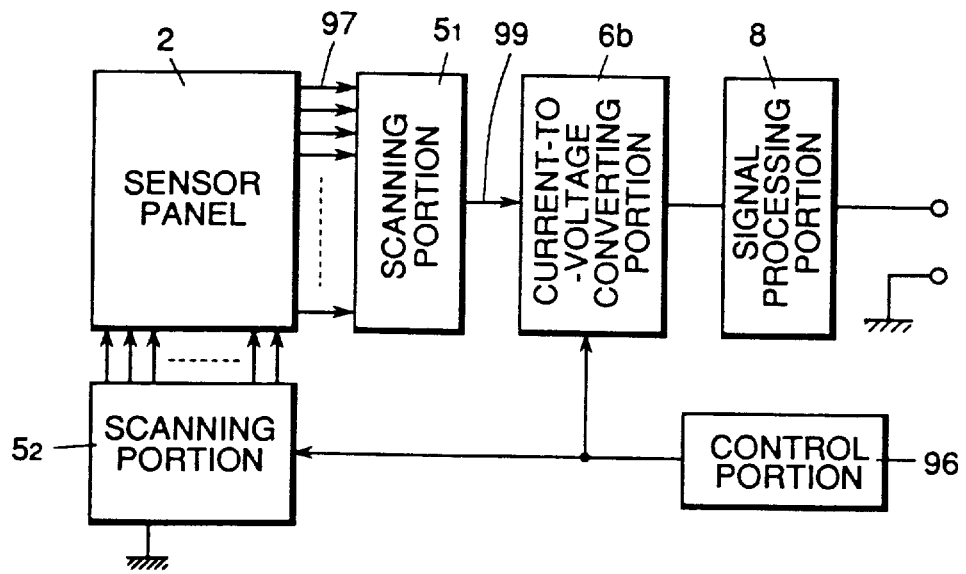

FIG. 21(A) shows an example of a sensor panel with a plurality of current-to-voltage converting portions 6a provided one for each photoelectric cell. FIG. 21(B) shows a sensor panel 2 with a separate current-to-voltage converting portion disposed outside the sensor panel 2. FIG. 22(A) is a block diagram of an embodiment using the sensor panel 2 of FIG. 21(A). A signal 97 from the sensor panel 2 disposed in front of a current-to-voltage converting portion 6a is a current signal and a signal 98 from the current-to-voltage converting portion 6a disposed in front of a first scanning portion $5_1$ is a voltage signal. FIG. 22(B) is a block diagram of an embodiment using the sensor panel shown FIG. 21(B). A signal 97 from the sensor panel 2 disposed in front of a first scanning portion $5_1$ is a current signal.

As described above, the embodiment of FIG. 22(B) can directly scan outputs of the sensor panel by a multiplexor, converts current signal 99 from the multiplexor into voltage signal and then amplifies the signal. The sensor panel is simple in construction (with no preamplifier) and easy to manufacture with a reduced size. It becomes also possible to separately adjust a gain of the amplifier circuit of the single unit type current-to-voltage converting portion 6b shown in FIG. 21(B) in accordance with the quality of a document to be read and the quantity of light from the light source with no fear of affecting the performance of the sensor panel 2.

A notebook type information reading device shown in FIG. 20 can be easily realized by using any one of the above-mentioned embodiments.

An information reading device according to the present invention is capable of two-dimensionally reading image information by electrically scanning a two-dimensional matrix of photoelectric cells. The device has no need for driving mechanism for mechanically moving the document or a sensor panel. The document is only placed on the sensor panel. The device can be made smaller and thinner than the conventional. Light from a light source passes through first-layer electrodes made of material having high transmissivity and a transparent substrate and strikes the document surface and reflected light therefrom passes back the transparent substrate and the first layer electrodes. An amorphous silicone layer is interposed between second layer electrodes made of material having low transmissivity and the above-mentioned first layer electrodes to form photoelectric cells which receive the reflected light and produces information signals at a high sensitivity.

An information reading device according to the present invention has a reading portion which comprises a sensor panel superposed on a thin flat type light source and tightly fixed in a fixing frame. Therefore, the light source can evenly illuminate a whole surface of a document placed on the sensor panel. The reading portion is provided with a flapper cover that can tightly cover and hold a document on the sensor panel. This cover prevents the document from displacing while the reading portion reads it. The cover can close an entire surface of the sensor panel, assuring effective use of directional light radiation from the light source in the reading portion. It can stabilize signals by effectively shutting off the external light. The reading portion is tightly closed with the cover effectively protecting against noise. The information reading device is of thin notebook type which is easy to use by unskilled user. It requires the user to put a document on the sensor panel and close the cover thereon.

An information reading device according to the present invention is capable of reading, for example, a character-and-graphic image written on a page of a book or on a surface of a space structure by placing its reading portion on the desired part of the page or of the space structure. It can read information, e.g., from a signboard, an advertising board, a name plate, a label and so on. The device requires users only to place its reading portion on a desired written part of the object to be read. It has no need to mechanically move the reading portion on the object. This device is preferably used as a portable input instrument.

Figure 24:
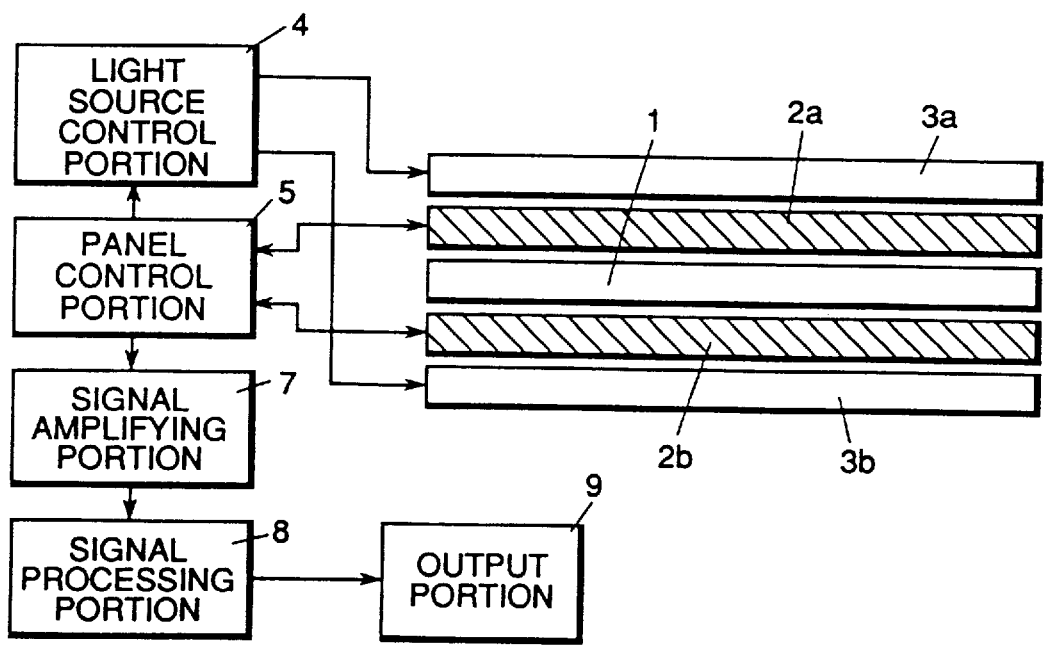
FIG. 24 is a view for explaining a functional structure of an information input device embodying the present invention.
Figure 25:
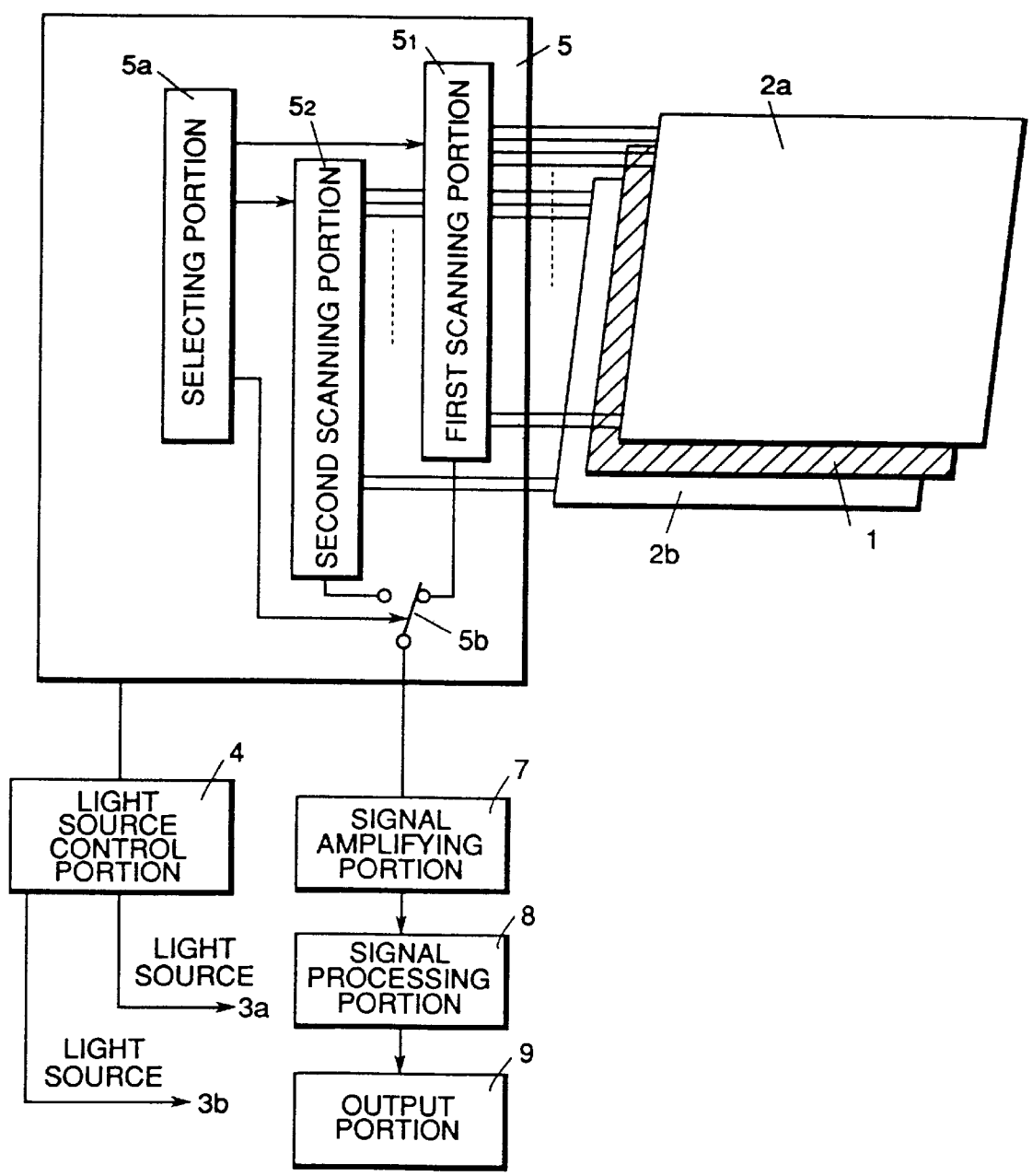
FIG. 25 is a view for explaining a panel control portion.

Referring to FIGS. 24 and 25, the structure and the operation of an information input device embodying the present invention will be described as follows: FIG. 24 shows the functional structure of the information input device according to the present invention. FIG. 25 shows a preferred structure of a control portion. The same members will be described with the same reference numerals unless otherwise specified.

A document sheet 1 with character-and-graphic information written on both sides thereof is placed with its front face on a sensor panel 2a with a flat type light source 3a and with its reverse face on a sensor panel 2b with a light source 3b. Light from the light source 3a passes transmissible area of the sensor panel 2a and strikes the top face of the document 1. The reflected light therefrom is detected by the sensor panel 2a. Light from the light source 3b passes transmissible area of the sensor panel 2b and strikes the reverse face of the document 1. The reflected light therefrom is detected by the sensor panel 2b. Information on both sides of the document 1 is thus read and inputted.

A light source control portion 4 performs ON-OFF control of the light sources 3a and 3b each of which, hereinafter, unless otherwise specified, is kept ON while information being inputted. The panel control portion 5 is connected to a first scanning portion $5_1$ and a second scanning portion $5_2$, each of which consists of two scanning portions: one horizontally scans and the other vertically scans a matrix of photoelectric cells formed in the sensor panel 2a or a matrix of photoelectric cells formed in the sensor panel 2b. A selecting portion 5a generates a control signal for switching a selecting switch 5b to select the sensor panel 2a or 2b to get an output signal the selected sensor panel 2a or 2b. The panel control portion 5 controls the light source control portion 4 and detects output signals of the photoelectric cells of the sensor panels 2a and 2b. A signal amplifying portion 7 amplifies and converts the detected output current signals to voltage signals suitable for further processing. The signal processing portion 8 conducts analog-to-digital conversion of the voltage signals received from the signal amplifying portion 7 to output the digital signals representing the original character-and-graphic information. An output portion 9 including a memory portion stores digitized signals from the signal processing portion 8 into the memory portion in synchronism with scanning the sensor panels 2a and 2b. A computer (not shown) rearranges the stored digital data into two-dimensional coordinates of the original information to be reproduced on the output portion 9.

When inputting information from the document 1, the panel control portion 5 controls the scanning portions $5_1$ and $5_2$ so that scanning the photoelectric cells of the second sensor panel 2b begins after completion of scanning all photoelectric cells of the first sensor panel 2a and detection of all output signals therefrom. This enables the first and second scanning portions $5_1$ and $5_2$ to commonly use the same switching circuits. The scanning portions can be simplified. Switching from the first sensor panel to the second sensor panel is conducted once and the signal processing is conducted page by page. No switching noise occurs and the signal-to-noise ratio is improved. Reading speed can also be increased.

The above-mentioned embodiment adopts changing over two sensor panels from one to another by using the selector switch 5b. It may be modified by providing each sensor panel with a special (not common) system consisting of a signal amplifier portion 7, a signal processing portion 8 and an output portion 9. However, the shown embodiment is preferable to use from the view point of saving hardware.

In practice, a weak-current signal of 1 nA level from the sensor panel is converted and amplified by a signal amplifying portion 7 to a voltage signal of $5 \times 10^8$ V/A (signal-to-noise ratio is not less than 48 dB). A signal of 0.5V is digitized by 16 bits by a signal processing portion 8. In this instance, the light source is previously adjusted so that output current of each photoelectric cell that is within a range of 0.1 nA to 5 nA (level). The minimal current value and the maximal current value of each photoelectric cell represent white pixel and black pixel of the document. The current outputs of the scanned photoelectric cells are converted to corresponding voltage signals. By doing so, it becomes unnecessary to mount a plurality of preamplifiers in each sensor panel which can be, therefore, designed to be compact and manufactured at a reduced cost. Furthermore, the signal amplifying portion is separated from the sensor panels and separately shielded. Noise signal from the light source can be shut off and the quality of signal processing can be increased.

Although the document 1 having character-and-graphic information written on both sides, the sensor panels 2a, 2b and the light sources 3a, 3b are spaced in the illustration of FIG. 24, they must be in close contact with each other in practice to obtain stable output signals.

Figure 26A:
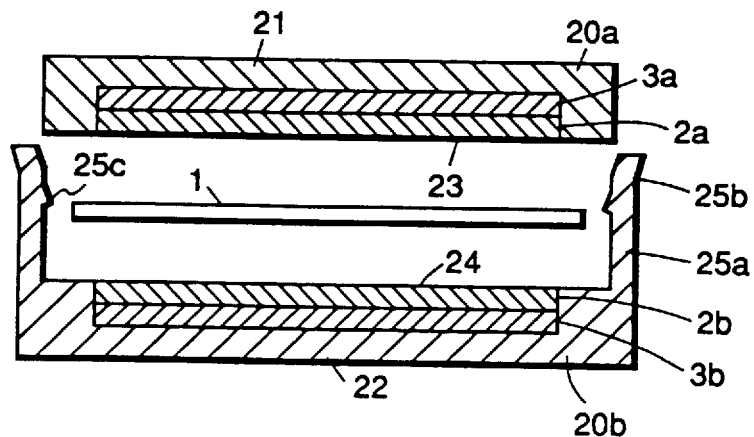
Figure 26A:
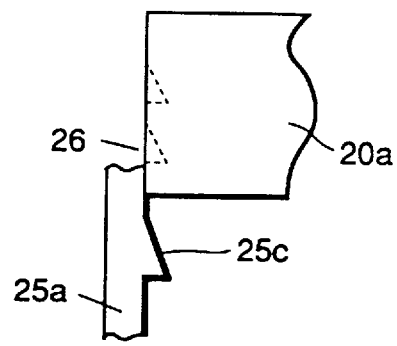

FIG. 26(A) illustrates an embodiment of an information input device which interposes a document 1 having information written on both sides between two sensor panels 2a and 2b which oppose to each other at their light-receiving surfaces of photoelectric cells. The sensor panel 2a and its light source 3a are coupled together and integrally fixed in a fixing frame 20a to form a first flat reading portion 21. The first flat reading portion 21 allows light from the light source to easily pass through the sensor panel 2a. Similarly, the sensor panel 2b and its light source 3b are integrally fixed in a fixing frame 20b to form a second flat reading portion 22. The document 1 with information written on both sides is tightly sandwiched between the first flat reading portion 21 and the second flat reading portions 22. To easily match the light-receiving surface 23 of the first flat reading portion 21 with a light-receiving surface 24 of the second flat reading portion 22, the device is provided with a guide frame 25a for guiding the first flat reading portion which encloses therealong the document 1 placed on the second reading portion 22. It is preferable to provide the device with a frame 25b made of elastic material (e.g., rubber) for easier placing and removing the document 1.

It is preferable to provide the frame 25a with fingers 25c and to make finger-receiving holes 26, as shown in FIG. 26(B) in a fixing frame 20a of the first flat reading portion 21 in order to reliably hold the document 1. It is also effective to provide a plurality of finger-receiving holes 26 in the fixing frame to use depending upon thickness of a document to be held.

Figure 27:
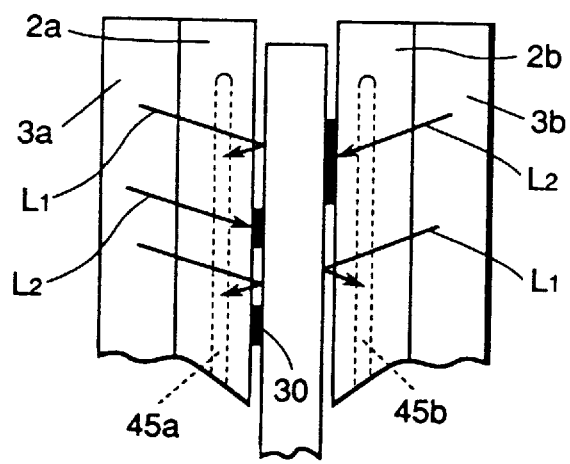
FIG. 27 is a view for explaining an input of an information input device embodying the present invention.

Referring to FIG. 27, the operation of the information input device when reading two sides of a document 1.

The device is now used for reading information written with black ink on the both white faces of a document. A part of light (e.g., light $L_1$) from light sources 3a, 3b redounds from a white (no-information) area of the document and is received by some of photoelectric cells 45a, 45b whereas a part of light (e.g., light $L_2$) fallen on a written area 30 of the document is almost absorbed by black ink and so little reflected not to be detected by the corresponding photoelectric cells. The photoelectric cells thus produce differently valued signals representing information.

Figure 28:
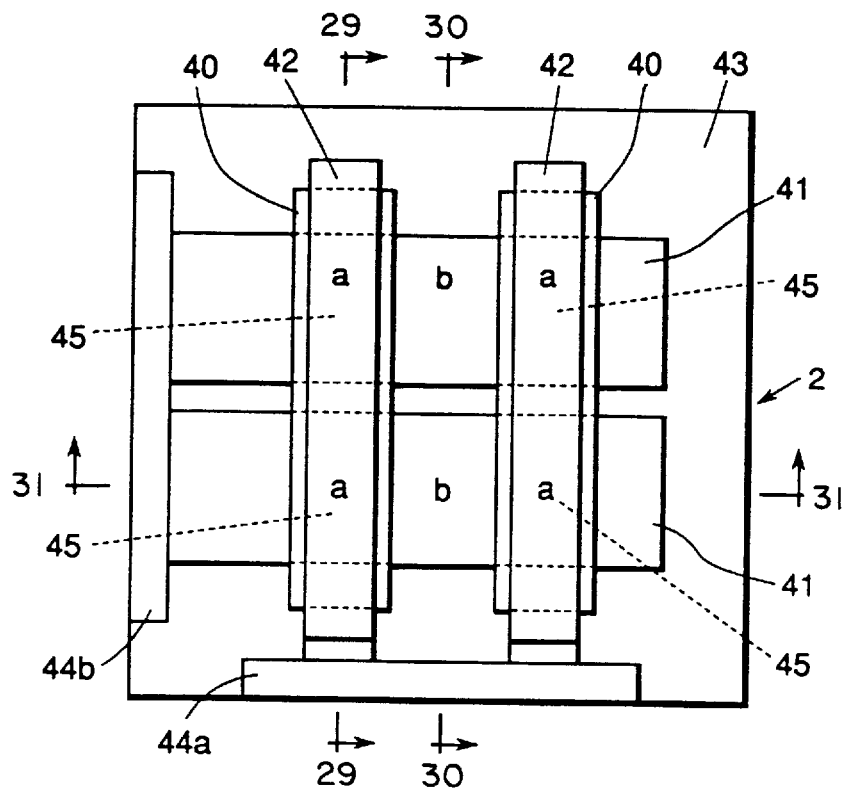
FIG. 28 is a view showing the flat structure of a sensor panel.

Referring FIGS. 28, 29 and 30 (which are the same as that shown in FIGS. 5 to 7), the structure of the sensor panels 2a and 2b will be described below:

FIG. 28 is a plan view of a two-dimensional matrix sensor panel. FIG. 29 is a section taken on line A–A' of FIG. 28 and FIG. 30 is a section taken on line B–B' of FIG. 28. In FIGS. 28 to 30, numeral 43 designates a transparent substrate made of, e.g., glass and numeral 41 designates a first layer of electrodes made of material (e.g., ITO) having high transmissivity and formed in stripes on the transparent substrate 43. The transparent substrate has the first layer of striped electrodes 41 formed thereon, an amorphous silicone layer 40 formed in stripes disposed orthogonally to the first striped electrodes 41 and second striped electrodes 42 made of material (e.g., nickel) having low transmissivity and laid over the amorphous silicone layer. The transparent substrate 43 is provided at its end portion with output terminals 44a and 44b for transferring output signals to the scanning portions $5_1$ and $5_2$, respectively, of FIG. 25.

Figure 29:
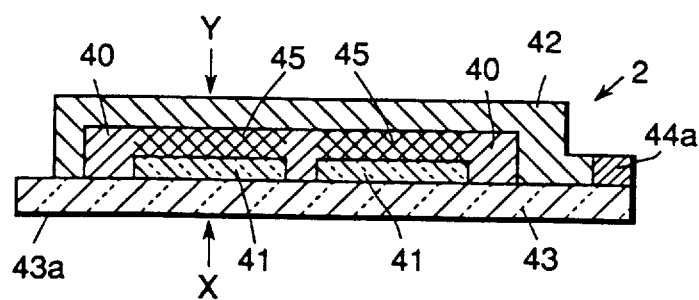
FIG. 29 is a section A–A' of the sensor panel of FIG. 28.

As shown in section A–A' of FIG. 29, first striped electrodes 41, striped amorphous-silicone layer 40 and the second striped electrodes 42 are formed in layers in the described order on the transparent substrate. Accordingly, a photo-electric cell is formed at a position "a" where a first striped electrode 41 and a second striped electrode 42 intersect each other in a two-dimensional matrix.

Figure 30:
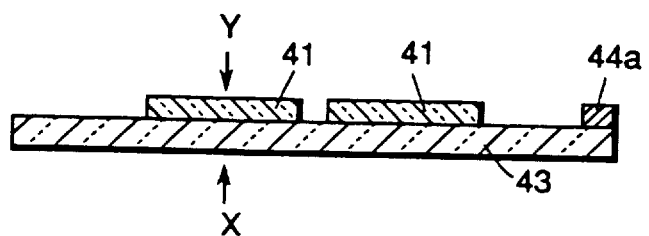
FIG. 30 is a section B–B' of the sensor panel of FIG. 28.

In the section B–B' of FIG. 30, only first striped electrodes 41 are formed on the transparent substrate 43. Accordingly, only a first striped electrode 41 made of material having high transmissivity exists as a position "b" in the section B–B' on the substrate. The transmissivity of the block "b" is therefore higher than that of the block "a" in the section A–A'. If the first striped electrodes 41 are made of transparent material such as ITO, its transmissivity can be increased to about 80%. In this case, the transmissivity of the block "b" may be 75% if the transparent substrate 43 is made of glass having transmissivity of about 95%.

Referring to FIG. 30, incident light X enters the transparent substrate 43 and passes the block "b" (FIG. 28), i.e., the transparent substrate 43 and the first striped electrode 41 and incident light Y enters the transparent substrate 43, passes the block "b" (FIG. 28), i.e., the transparent substrate 43 and the first striped electrode 41. This means that the block "b" possesses satisfactory high transmissivity.

On the other hand, incident light from the side X or Y (FIG. 29) enters a three-layer block 45 (FIG. 29) consisting of the first electrode layer 41, the amorphous silicone layer 40 and the second electrode layer 42 but it is shut off by the second electrode layer 42 having low transmissivity and can not pass the block.

A photoelectric cell 45 is thus created in the two-dimensional matrix at the place "a" whereat the first striped electrode 41 and the second striped electrode 42 intersect at a right angle.

The amorphous silicone layer 40 has a very low conductivity in horizontal direction. Accordingly, a photoelectric cell 45 is formed only at a place "a" whereat the first striped electrode 41 and the second striped electrode 42 even if stripes of the amorphous silicone layer 40 continue to each other. Therefore, there is almost no leak between neighboring photoelectric cells through an amorphous silicone layer.

A method for forming electrode layers and an amorphous silicone layer on a transparent substrate, which was not described hereto, may be such that a thin film is formed by using CVD (Chemical Vapor Deposition) equipment and then etched in any suitable way. The amorphous silicone layer is may be formed on the first-layer electrodes in the order of p-type semiconductor, insulating layer and n-type semiconductor or n-type semiconductor, insulating layer and p-type semiconductor. Similar functions may be obtained. In short, it is essential to form a photoelectric cell at a point where the first-layer electrode and the second-layer electrode intersect. The sensor panel, shown in FIG. 28, does not depend upon the number of photoelectric cells in a matrix. It may be composed of 4 photoelectric cells as shown in FIG. 28 or a large number of photoelectric cells, e.g., more than 1000.

Referring to FIG. 29, a photoelectric cell 45 does not respond to light entering sensor panel through a surface of the second electrode 42 of low transmissivity whereas it produces photovoltanic current in response to light having entered through a surface 43a of transparent substrate 43 and the first electrode 41 of high transmissivity. This is because the transmissivity of the first electrode 41 differs from the transmissivity of the second electrode 42.

Figure 31:
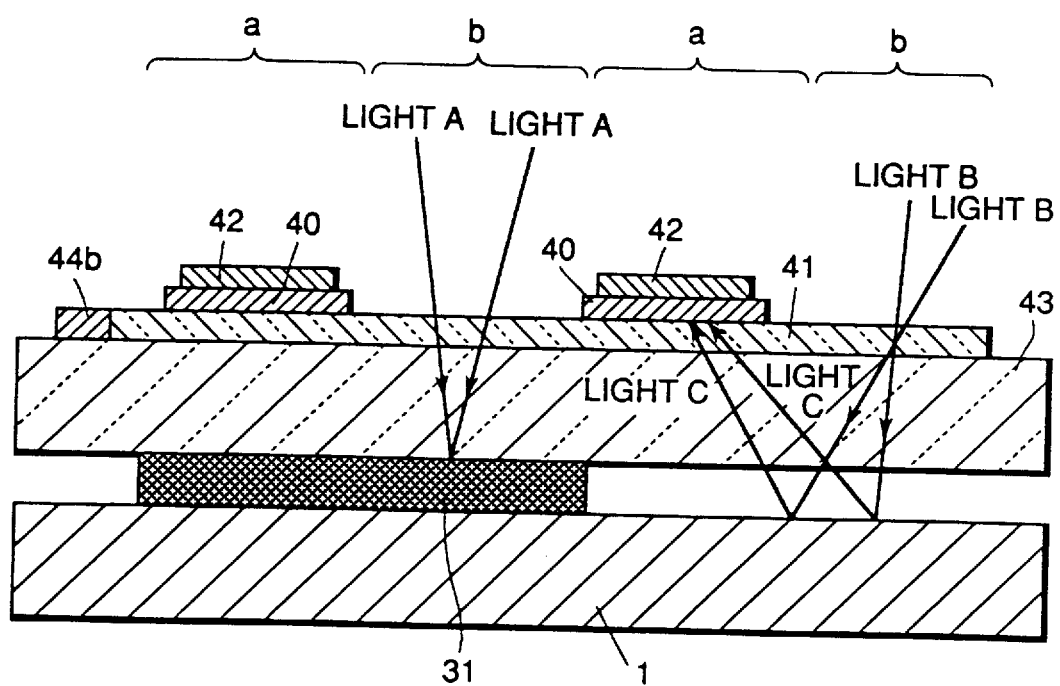
FIG. 31 is a large-scaled sectional view C–C' of the sensor panel of FIG. 28.

Now, it will be explained below how to input information by an information reading device according to the present invention with reference to FIG. 31 which is an enlarged-scale sectional view taken along line C–C' of FIG. 28.

A document 1 to be read is closely put onto the surface of a transparent substrate 43. This document 1 is supposed to contain information written with ink thereon. (For easy understanding of description, the shown document 1 has writing (of thick layer ink) on one-side only, but it may have writings on both sides.) Blocks "a" and "b" shown in FIG. 31 work as described with reference to FIG. 28, i.e., the block "a" does not transmit light whereas the block "b" allows light to pass. When light A and light B enter a sensor panel through its surface opposite to the panel surface whereto the document 1 is attached, the light A and the light B pass blocks "b" of a first-layer electrode 41 and a transparent substrate 43 and strikes the surface of the document 1. At this time, the light A that illuminated a written part of the document surface (i.e., with character-and-graphic information written with ink 31) is almost absorbed by the ink 31 and is scarcely reflected therefrom. On the contrary, the light B that illuminated a blank (white) part of the document surface 1 rebounds back therefrom as strong reflected light C. A matrix of the photoelectric cells measures the intensity of reflected light from the document and produces current being proportional to the intensity of the reflected light, which current signal represents the information on the document.

One of two sensor panels was described above. It is, however, preferable that both sensor panels are the same in structure and use the same light sources so as to obtain even quality of output signals.

Light-emitting diodes (backlight LED) and electroluminescence elements (backlight EL) can be used as light sources. Luminescent lamps, which are cold cathode-ray tubes (or hot cathode-ray tubes) usually used as backlights of a liquid crystal panel, may also be applied as the light sources of the sensor panels.

Light-emitting diodes are drivable with a low voltage of 5V (at TTL level) and therefore have no influence on the quality of processing signals from the sensor panel. Furthermore, the light-emitting diodes does not require any peripheral circuit and can be enough driven by a voltage-controlled oscillator (VCO) only. The used light-emitting diodes compose an LED panel that is capable of evenly emitting light from an entire surface of a large working area and is drivable with a typical voltage of 4.2V and a maximum voltage of 6V. Application of the LED type light source is effective to save the overall size of the device and to reduce noise to the sensor panel.

The EL type light source is featured by its high luminosity enough to produce a large output signal of the sensor panel but requires a high driving voltage of about 100V that may produce noise signals. Therefore, the information input device with the EL type light source must include means for shielding the entire device system. However, the EL type light source in comparison with a light source consisting of a cold or hot cathode-tube type luminescent lamps and an LED type light source is thinner and flat. Therefore, it can be tightly superposed on a sensor panel, assuring effective use of small light with a minimized leakage. Application of the EL type light source makes it possible to detect a signal from the sensor panel even at a reduced quantity of light, i.e., at a reduced driving voltage.

The device may be integrated with display units of in such a manner that a light transmissive liquid crystal panel is interposed between a light source and a sensor panel. Light from the light source consisting of a hot-cathode fluorescent lamp may reach a document surface and information displayed on the liquid crystal display can be seen through the sensor panel.

Figure 32:
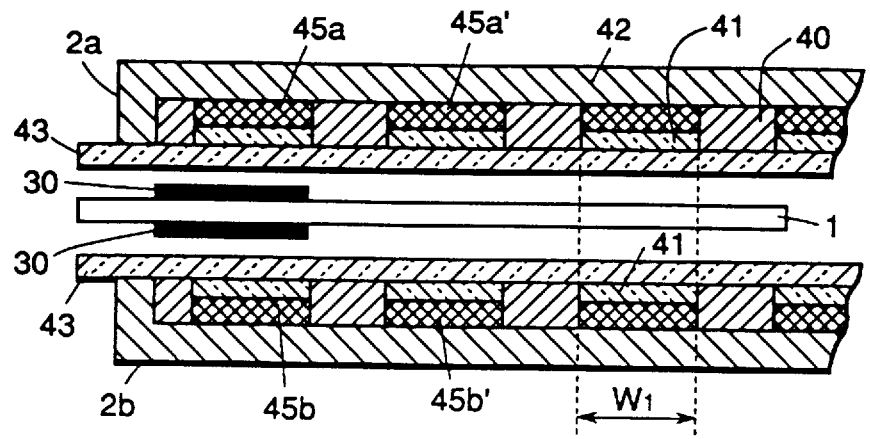
FIG. 32 is a view showing relative positions of photoelectric cells when interposing a document between two sensor panels.

Referring to FIGS. 28 and 32, a preferable arrangement of the sensor panels of the abovementioned information input device. It is preferable that both sensor panels are formed the same of an amorphous layer 40, first electrode layer 41, second electrode layer 42 and transparent substrate 43 with the same kind of light source. The same quality of output signals of the sensor panels can be obtained.

The sensor panels of the information input device made of the above-mentioned structure and operate as described above. But, if a part of information of the document is located at such a place on the sensor panel where no photoelectric cell 45 exists thereunder, its image may fade out in a two-dimensional coordinate system at the final stage of signal processing. To avoid this, it is preferable to coaxially oppose the photoelectric cells 45a of the sensor panel 2a to the photoelectric cells 45b of the sensor panel 2b when two sensor panels 2a and 2b are placed on one another with a document 1 interposed therebetween as shown in FIG. 32. By doing so, the same accuracy level of signal detection can be obtained at the same positions (having the same coordinates) on both sides of the document 1. This can also suppress the effect of leaking light through when reading information by illuminating the both sides of the document 1.

An amount of electromotive force of a photoelectric cell depends upon its light-receiving surface. Accordingly, it is preferred in the embodiment to equalize the light-receiving surface of each photoelectric cell 45a of the sensor panel 2a covering the front face of the document 1 and the light-receiving surface of photoelectric cells 45b of the sensor panel 2b covering the reverse face of the document 1. Electromotive forces produced by a photoelectric cell 45a and a photoelectric cell 45b (i.e., current values of their output signals) are equal to each other under the same conditions of light quantity and light reflectance of the document 1. Signal processing will be simplified.

It is preferred in the embodiment that the first electrodes 41 of the first sensor panel 2a and the first electrodes 41 of the second sensor panel 2b are opposed to each other and the second electrodes 42 of the first sensor panel 2a and the second electrodes 42 of the second sensor panel 2b are opposed to each other. This enables two panels to have the same vertical resolution and horizontal resolution. Two sensor panels preferably have the same light-receiving surface that can be achieved by opposing electrodes of uniform width.

Another method for scanning sensor panels by a panel control portion 5 of the above-mentioned information input device is as follows:

Opposed couples of photoelectric cells of the first and second sensor panels are scanned alternately and sequentially, i.e., one by one in the first panel, the second panel, the third panel and so on. Such scanning is effective to surely maintain relative locations of information on the upper and bottom faces of the document 1. Referring to FIG. 32, photoelectric cells 45a, 45b, 45a' and 45b' are sequentially scanned in the described order. With a document whose size is smaller than the working surface of the sensor panels, this scanning method scans only the both faces of the document (without scanning the whole working surfaces of the sensor panels). Light from the light source is reflected by the document interposed between the two sensor panels and reflected light is sensed by the corresponding photoelectric cells that causes signals being proportional to the intensity of the received light. The completion of scanning the document can be recognized by detecting a change of light signal, which represents absence of the document. With a document whose size is larger than the surface of each sensor panel, a necessary scanning area on the photoelectric cells is determined to scan only the necessary areas of both sides of the document and finishes the scanning at that time.

Another method for scanning the sensor panels by the panel control portion 5 of the above-mentioned information input device is described as follows:

The panel control portion 5 controls two sensor panels so as to switch the light source of one sensor panel that is not being scanned. Namely, a scanning signal of each sensor panel is interlocked with a drive of each light source in such a way that the light source for illuminating the reverse side of a document is turned off while the top side of the document is read and the light source for illuminating the front side of a document is turned off while the reverse side of the document is read. This is realized in practice by connecting a light-source control portion 4 to the panel control portion 5 and by synchronizing a control signal of the light-source control portion 4 for controlling switching the light sources 3a and 3b with a scanning control signal of the panel control portion 5 to the sensor panels 2a and 2b.

Only a necessary light-source can be switched ON in synchronism with a scanning signal of a sensor panel. This can completely eliminate such a trouble that light from a light source unnecessary for detecting information (i.e., light illuminating the opposite side of a document when this side of the document is now being scanned) passes the document and put unnecessary opposite-side information into this side information. In the other words, light that is emitted from, e.g., the front-side light-source and rebounds back from the front surface of the document is increased by light from the reverse side light-source, which passed through the document. The transmitted light rays from the opposite side of the document have different values of light quantity depending on which of written and white (unwritten) areas they passed. Consequently, the reflected light is increased unevenly by the unevenly transmitted light, resulting in erroneously representing the information of the front side of the document. The above-mentioned light-source control can also be applied to the case of scanning, dot by dot or line by line, a matrix of photoelectric cells of each sensor panel.

Figure 33:
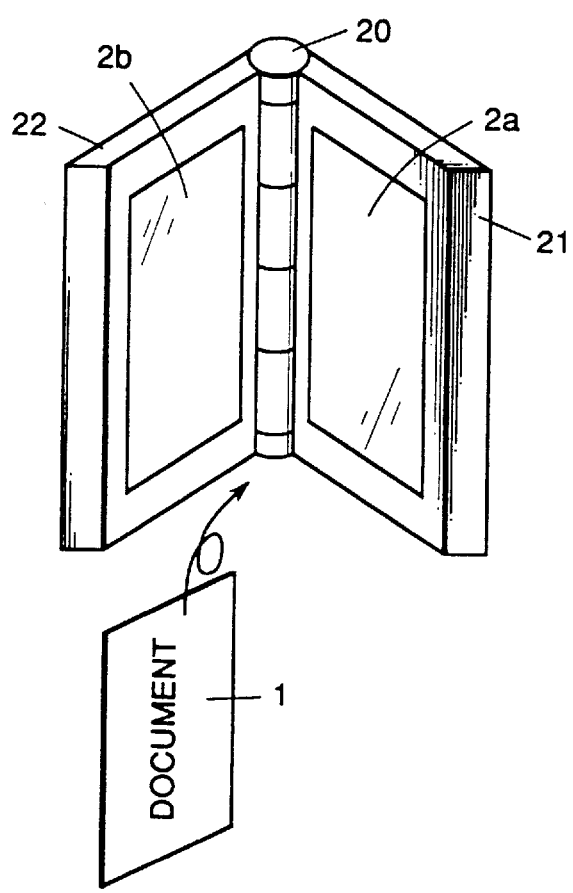
FIG. 33 is a view showing an information input device embodying the present invention.

FIG. 33 illustrates an example of the abovementioned information input device which is further provided with protection against external light other than light from internal light sources when the two sensor panels are tightly closed with each other with a document interposed therebetween.

Figure 34A:
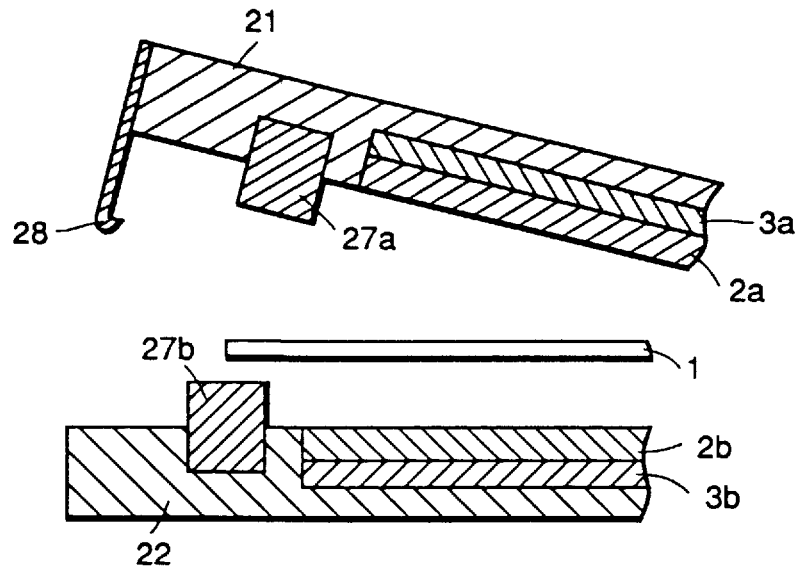
FIGS. 34(A) and 34(B) are views for explaining details of the information input device of FIG. 33.
Figure 34B:
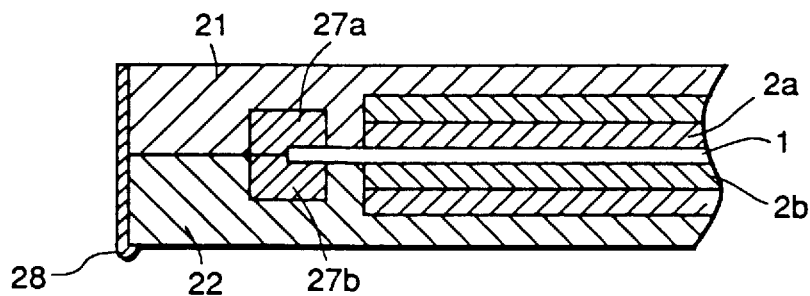

A document sheet 1 is placed on a sensor panel 2a and sandwiched between a first reading portion 21 and a second reading portion 22 to read information on the document 1. A pocketbook o r notebook type information input device is realized by turnably jointing the first reading portion 21 and the second reading portion 22 with a hinge 32. As shown in FIG. 34(A), the both reading portions 21 and 22 are provided with elastic (e.g., rubber) fixing members 27a and 27b respectively to increase the tightness of contact between the document 1 and the sensor panels 2a and 2b and to firmly holding the document 1 after closing the reading portions 21 and 22 (FIG. 34(B)).

It is preferred in the shown embodiment that the first reading portion 21 is provided with an engaging finger 28 at an end opposite to its hinged end to fix the document interposed between the reading portions 21 and 22. To shut off the external light and eliminate a noise, it is preferable to use the fixing members 27a, 27b made of conductive rubber. To completely protect the device against the external light and noise, it is preferred to provide the elastic conductive rubber at a whole periphery of each sensor panel. It may be allowed to provide only one of fixing members 27a and 27b.

Figure 35:
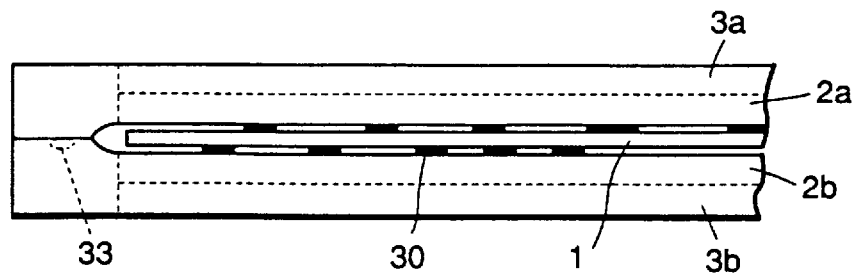
FIG. 35 shows another embodiment of an information input device according to the present invention.

FIG. 35 shows a modification of the information input device shown in FIG. 33.

Sensor panels are disposed in concaves of casings of respective reading portions to shut off natural external light (other than light from the internal light source) in closed state of the reading portions. Reading can be started after a closing sensor 33 detected the reading portions in completely closed position. This enables the device to effectively use directional light from the light sources to the sensor panels and to obtain stable output signals by reliably shutting off the external light. Protection against external noise is achieved by using the metal-made casings of the reading portions.

The information input device shown in FIG. 33 is used normally in the closed state. It may be used in the open state in the following manner (see FIGS. 36 and 37).

Figure 36:
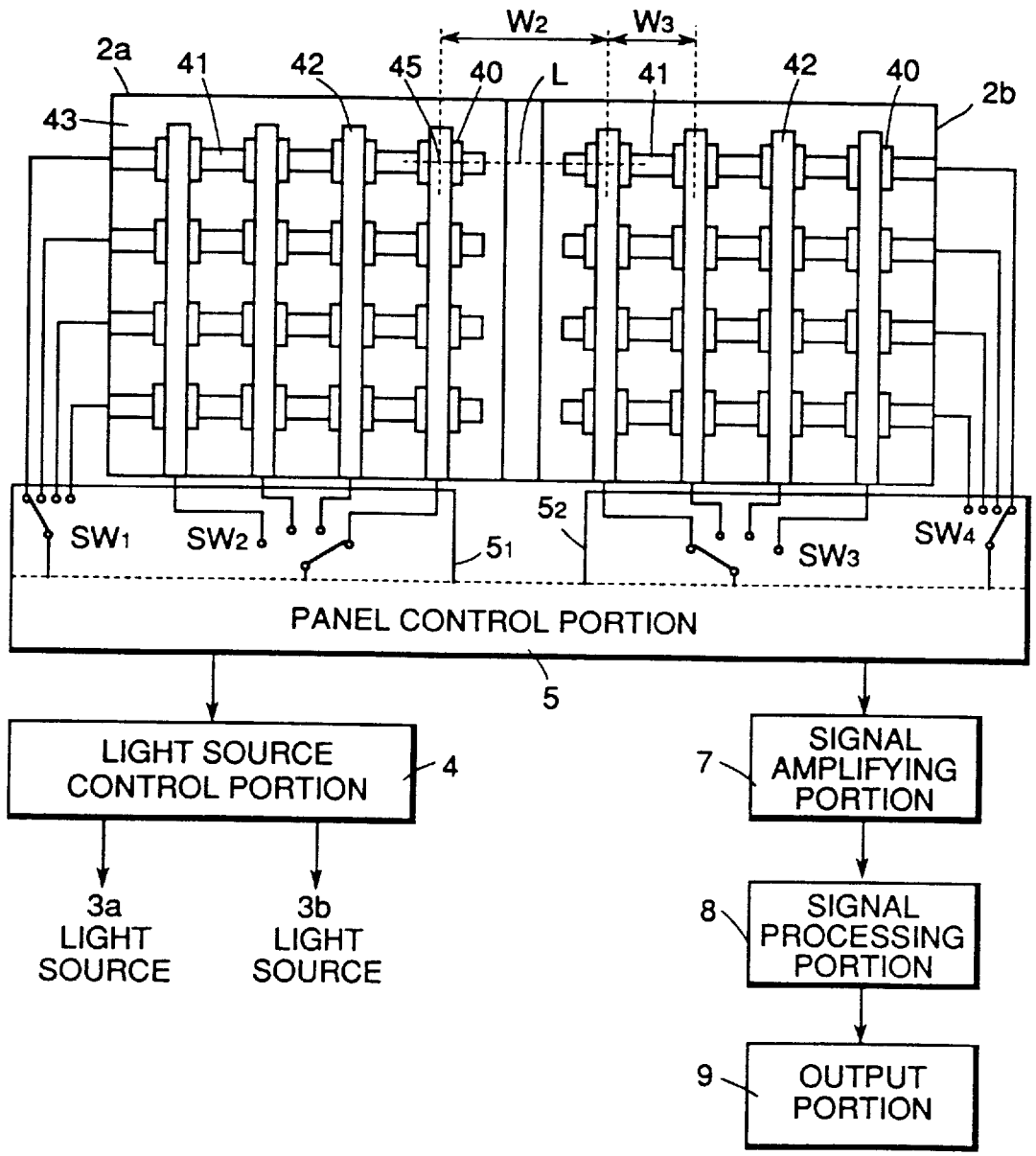
FIG. 36 shows the open state of an information input device according to the present invention.
Figure 37:
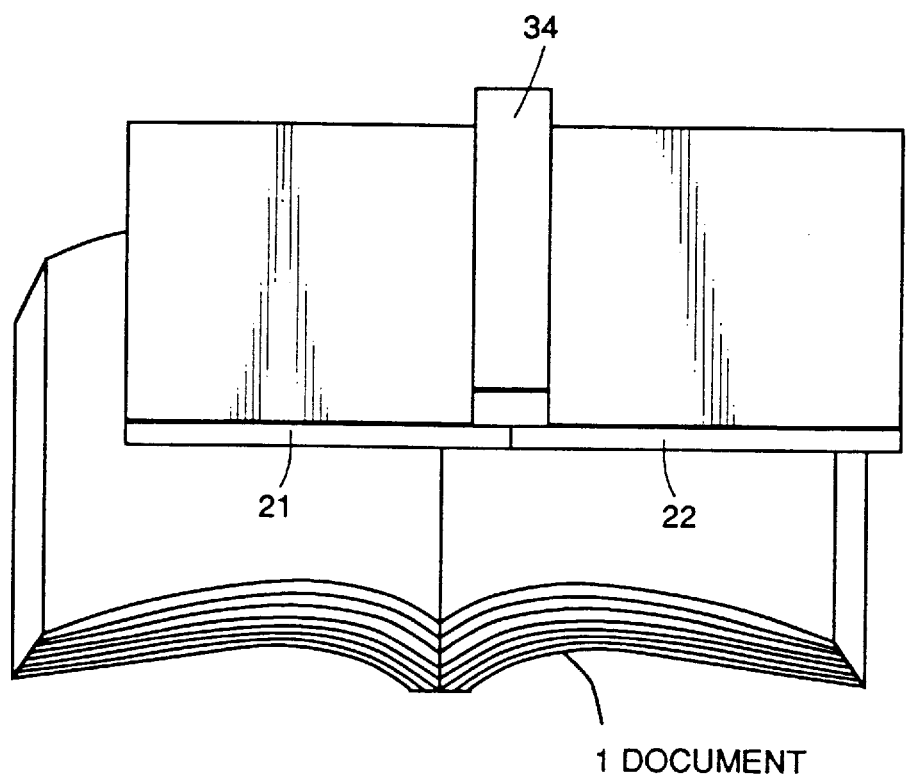
FIG. 37 is illustrative of an information input device according to the present invention when it is used as being open.

FIG. 36 shows an information input device which is opened as a single flat input panel by opening two flat reading portions like a notebook at least by 180 degrees by rotating the hinge coupling about its axis. FIG. 37 shows the information input device when using it in the open state in practice for inputting information from two open pages of a book.

Photoelectric cells 45 in a sensor panel 2a and a sensor panel 2b are scanned sequentially line by line or dot by dot by sequentially changing-over switches SW1 to SW4 so as to continue scanning from the left sensor panel 2a to the right sensor panel 2b as shown in FIG. 36. A first electrode 41 in each sensor panel is preferably formed on the same straight line as shown by a virtual straight line L. It is desired that a distance $W_2$ from the last photoelectric cell in the sensor panel 2a to a first photoelectric cell in the sensor panel 2b approximates as near as possible to a distance $W_3$ between two neighboring photoelectric cells in the same sensor panel. With a large difference between the distances $W_2$ and $W_3$, an input information may be dull and its reproduced image may be partly dim. Accordingly, the articulated mechanism is used for opening and closing the flat reading portions jointed at a minimal distance therebetween.

The information input device can be used thus for inputting information from a large printed surface of a document (e.g., a newspaper) or from an uneven surface of document (e.g., a pocket notebook, a journal or a book) which is a concave at its center between two open pages. The hinged joint of the two flat reading portions can be rotated preferably not less than 180 degrees to be adaptable to the concave between two pages of an open book. The hinge joint is made of a small size so that it may be put deep into a concave easily formed at a center of the open book. It is preferred that the hinge joint is provided with a protrusion for guiding hinge joint into a center concave of an open document. This facilitates centering of the device on the document. A portable type information input device can be realized by minituarizing a panel control portion and a signal processing portion and housing them in a closing mechanism portion 34 including the hinge joint.

Figure 38A:
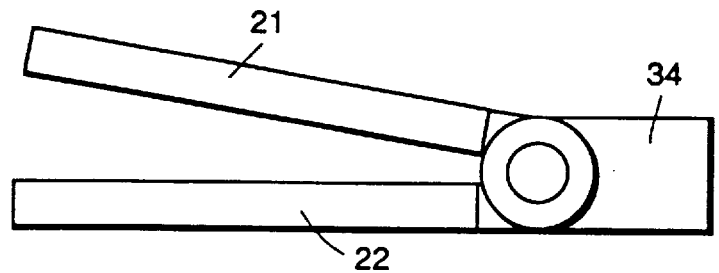
FIGS. 38(A) to 38(C) are views for explaining another way of using an information input device according to the present invention.
Figure 38B:
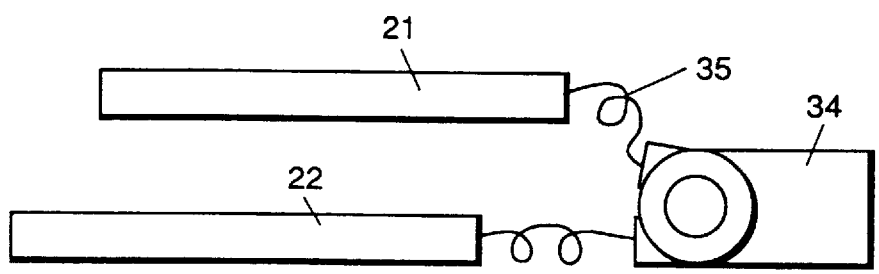
Figure 38C:
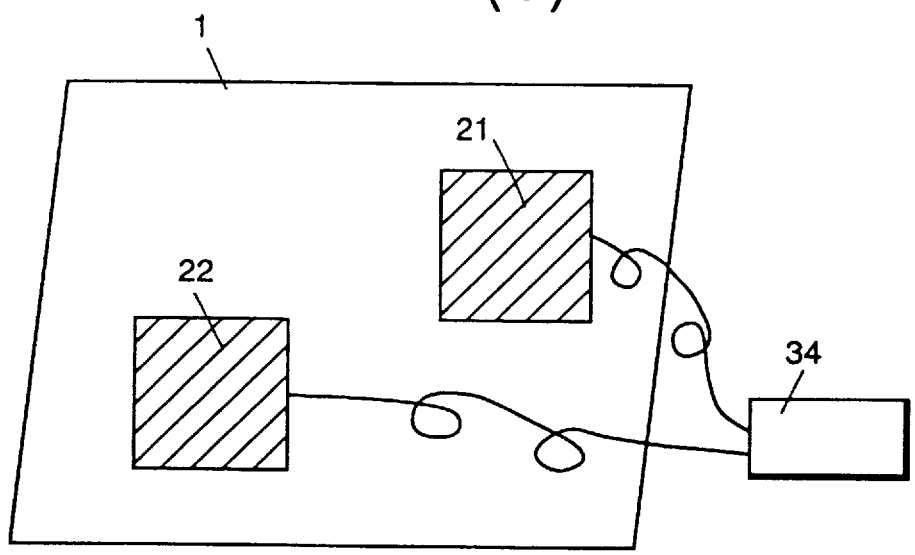

FIGS. 38(A) to 38(C) illustrate an example of an information input device whose flat reading portions can be separated from the main body. Referring to FIG. 38(A), the information input device has a closing mechanism portion 34 (see also FIG. 37) which contains a panel control portion 5, a signal amplifying portion 7, an image processing portion 8 and an output portion 9 for outputting read information in form of two-dimensional image data. FIG. 38(B) shows the device when its flat reading portions are separated from the closing mechanism portion and connected thereto with a cable 35. (The reading portions may be connected to the portion 34 by using the infrared communication method). Referring to FIG. 38(B), the flat reading portions 21 and 22 each consisting of a sensor panel and a light source are held by hand and put to a large-format document 1 to read a part of information from the document 1. Namely, a user is requested of only placing separated flat reading portions on the desired portion of the document. The device can read the necessary information from the document without being manually or mechanically moved on the document. The device is suitable to input various kinds of synthesized documents. It is capable of inputting information from, e.g., a signboard, a billboard, a nameplate and a label (see FIG. 38(C)). The separate use of the potable flat reading portions enables reading any object information at any place into its body portion disposed at different place or into any other potable device similar to its body portion.

As described above, the flat reading portions can be used in combination with any other device which has the same functions to those of the removable body portion 34 (closing mechanism portion). Such devices are, for example, a word processor, a computer, potable terminal, a pocket computer, an electronic calculator and a wrist watch if it includes the necessary functions.

As is apparent from the foregoing description, the present invention provides a small potable type information input device which is capable of inputting information from both sides of a document. Furthermore, the device can be available as a multi-function electronic notebook that, besides the above-mentioned facilities, incorporates pocket-computer functions, tablet-pen input function and memory function. It may be a leading device for multi-media applications.

An information input device according to the present invention has no mechanical drive and is, therefore, compact and quiet to work. The device is capable of reading both sides of a document at the same time.

An information input device according to the present invention is capable of reading information from both sides of a document with an even level of accuracy at the same coordinates of the both sides, assuring the uniform quality of outputs. In the case of inputting information from the same areas on both sides of a document, dim areas of reproduced images of information are located at same positions on both sides of the document. The input result is easy to read. The dim areas can be easily corrected since the correcting areas have the same coordinate values on both faces of the document (i.e., no photoelectric cell is located thereunder) and the related signals can be easily read out from a memory.

An information input device according to the present invention can securely hold a document and reliably input information therefrom.

An information input device according to the present invention is provided with elastic members at the periphery of each sensor panel and is capable of effectively illuminating a document with light from its light sources with no leakage. Therefore, the light sources may have a saved quantity of light and a saved power consumption. The above-mentioned elastic members can shut off external light with a result of obtaining a stabilized output without being affected external light. The elastic members are conductive and have improved noise rejection characteristics.

An information input device according to the present invention can be made of pocketbook or notebook type which is thin and handy to carry. Working surfaces of two flat reading portions can be well protected since they are normally covered with each other when being used and stored.

An information input device according to the present invention is capable of independently inputting information from each side of a document. There is no possibility of inclusion of noise components when scanning each sensor panel. High quality outputs can be obtained.

An information input device according to the present invention is capable of inputting information from a desired area of a document without scanning any excessive area. This assures saving in power consumption of the device.

An information input device according to the present invention is featured in that its power consumption is saved and no transmitted light from the opposite side of the document brings the opposite side information to this side information. This assures obtaining high-quality outputs.

We claim:

1. A thin information reading device for recognizing image information consisting of characters and/or graphics by transmitting light to an original document to which the image information is written and detecting reflecting light therefrom, comprising:

a sensor panel having a two-dimensional matrix consisting of a plurality of photoelectric cells;

a light source for illuminating a sheet of the original document closely put onto the sensor panel, wherein the light source comprises a flat thin plate which is laid over and fixed to the sensor panel;

a scanning portion for scanning a plurality of the photoelectric cells on the sensor panel;

a current-to-voltage converting portion for converting a current signal, which is produced by a matrix of the photoelectric cells when having received reflected light from the original document, into voltage signal;

an amplifier portion for amplifying an output of the current-to-voltage converting portion;

a signal processing portion for reproducing image information consisting of characters and/or graphics from a signal from the amplifier portion, wherein the two-dimensional matrix of photoelectric cells of the sensor panel is formed of a first layer of striped electrodes which are made of material having a high luminous transmittance and formed on a transparent substrate, a striped amorphous silicone layer overlaid in the direction orthogonal to the first striped electrodes on the transparent substrate, and a second layer of striped electrodes which are made of material having a low luminous transmittance and formed over the striped amorphous-silicone layer, and the thus formed photoelectric cell matrix serves as light-sensitive elements for optically reading the information.

2. A thin information reading device as defined in claim 1, wherein the light source emits light from one surface, which is laid over the sensor panel and tightly fixed together in a fixing frame to form a reading portion, said reading portion is provided with a cover for pressing an original document onto the upper surface of the sensor panel and said cover is turnably supported so that it can freely turn to open and close the top surface of the reading portion.

3. A thin information reading device as defined in claim 1, wherein the light source emits light from one surface, which is laid over the sensor panel and tightly fixed together in a fixing frame to form a reading portion, said reading portion is provided with a signal-converting portion for converting a signal from the reading portion into characters and/or graphics of image information and a cable for connecting an output of the reading portion to an input of the signal converting portion so that the reading portion can be separated from the signal converting portion and can be abutted to a space structure.

* * * * *